US012583128B2

(12) United States Patent
Shin et al.

(10) Patent No.: US 12,583,128 B2
(45) Date of Patent: Mar. 24, 2026

(54) MOBILE ROBOT AND METHOD FOR CONTROLLING MOBILE ROBOT

(71) Applicant: Samsung Electronics Co., Ltd., Suwon-si (KR)

(72) Inventors: Kyoungha Shin, Suwon-si (KR); Hyelim Park, Suwon-si (KR); Kangjun Seo, Suwon-si (KR); Soohyun Sung, Suwon-si (KR); Jonghyun Son, Suwon-si (KR); Myoungsoo Jang, Suwon-si (KR); Chihong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 18/432,606

(22) Filed: Feb. 5, 2024

(65) Prior Publication Data

US 2024/0342921 A1 Oct. 17, 2024

Related U.S. Application Data

(63) Continuation of application No. PCT/KR2024/001346, filed on Jan. 29, 2024.

(30) Foreign Application Priority Data

Apr. 17, 2023 (KR) ........................ 10-2023-0050337
Jul. 13, 2023 (KR) ........................ 10-2023-0091390

(51) Int. Cl.
B25J 13/06 (2006.01)
B25J 9/00 (2006.01)
(52) U.S. Cl.
CPC ............. B25J 13/06 (2013.01); B25J 9/0003 (2013.01)

(58) Field of Classification Search
CPC ...... B25J 13/06; B25J 9/0003; B25J 11/0005; B25J 11/008
(Continued)

(56) References Cited

U.S. PATENT DOCUMENTS 7,982,603 B2 7/2011 Moriwaki et al.
9,427,863 B2 8/2016 Lee
(Continued)

FOREIGN PATENT DOCUMENTS

JP 2013-250005 A 12/2013
JP 2016-220174 A 12/2016
(Continued)

OTHER PUBLICATIONS

International Search Report dated May 10, 2024, issued in International Application No. PCT/KR2024/001346.

*Primary Examiner* — Kira Nguyen
(74) *Attorney, Agent, or Firm* — Jefferson IP Law, LLP

(57) ABSTRACT

A mobile robot is provided. The mobile robot includes a communication circuitry configured to communicate with an electronic device, a sensor configured to detect a user, a user interface configured to provide information related to an operation of the electronic device, and a controller. The controller may be configured to: determine a target user to provide the information related to the operation of the electronic device, based on at least one of state information of the electronic device or user information obtained by the sensor, obtain event information about a change in the operation of the electronic device, determine a notification type of the event information, based on at least one of a location of the target user or a state of the target user, and control the user interface to provide the event information in the determined notification type.

18 Claims, 11 Drawing Sheets

(58) Field of Classification Search
USPC ........................................................ 700/264
See application file for complete search history.

(56) References Cited

U.S. PATENT DOCUMENTS

| | | | |
|---|---|---|---|
| 10,624,516 B2 | 4/2020 | Cudzilo | |
| 11,267,131 B2 | 3/2022 | Park et al. | |
| 11,472,038 B2 | 10/2022 | Krauss et al. | |
| 11,669,064 B2 | 6/2023 | Tsubota | |
| 2004/0066917 A1* | 4/2004 | Yasukawa | H04M 11/04 |
| | | | 379/88.01 |
| 2020/0012273 A1* | 1/2020 | Kim | H04W 88/04 |
| 2020/0066116 A1 | 2/2020 | Saito et al. | |
| 2020/0094398 A1* | 3/2020 | Young | B25J 11/008 |
| 2021/0026364 A1 | 1/2021 | Shin et al. | |

| | | | |
|---|---|---|---|
| 2022/0347862 A1* | 11/2022 | Lee | G06F 3/04847 |
| 2023/0191632 A1* | 6/2023 | Lee | B25J 11/008 |
| | | | 318/568.11 |
| 2024/0257471 A1* | 8/2024 | Lee | G06F 3/04842 |

FOREIGN PATENT DOCUMENTS

| | | | |
|---|---|---|---|
| JP | 6415919 B2 | 10/2018 | |
| JP | 6722174 B2 | 7/2020 | |
| KR | 10-0670941 B1 | 1/2007 | |
| KR | 10-2015-0086074 A | 7/2015 | |
| KR | 10-2018-0079823 A | 7/2018 | |
| KR | 10-2018-0106327 A | 10/2018 | |
| KR | 10-1940070 B1 | 4/2019 | |
| KR | 10-2019-0088122 A | 7/2019 | |
| KR | 10-2152731 B1 | 9/2020 | |
| KR | 10-2021-0089880 A | 7/2021 | |
| WO | 2007-110968 A1 | 10/2007 | |
| WO | 2018/179972 A1 | 10/2018 | |

* cited by examiner

Figure 11:
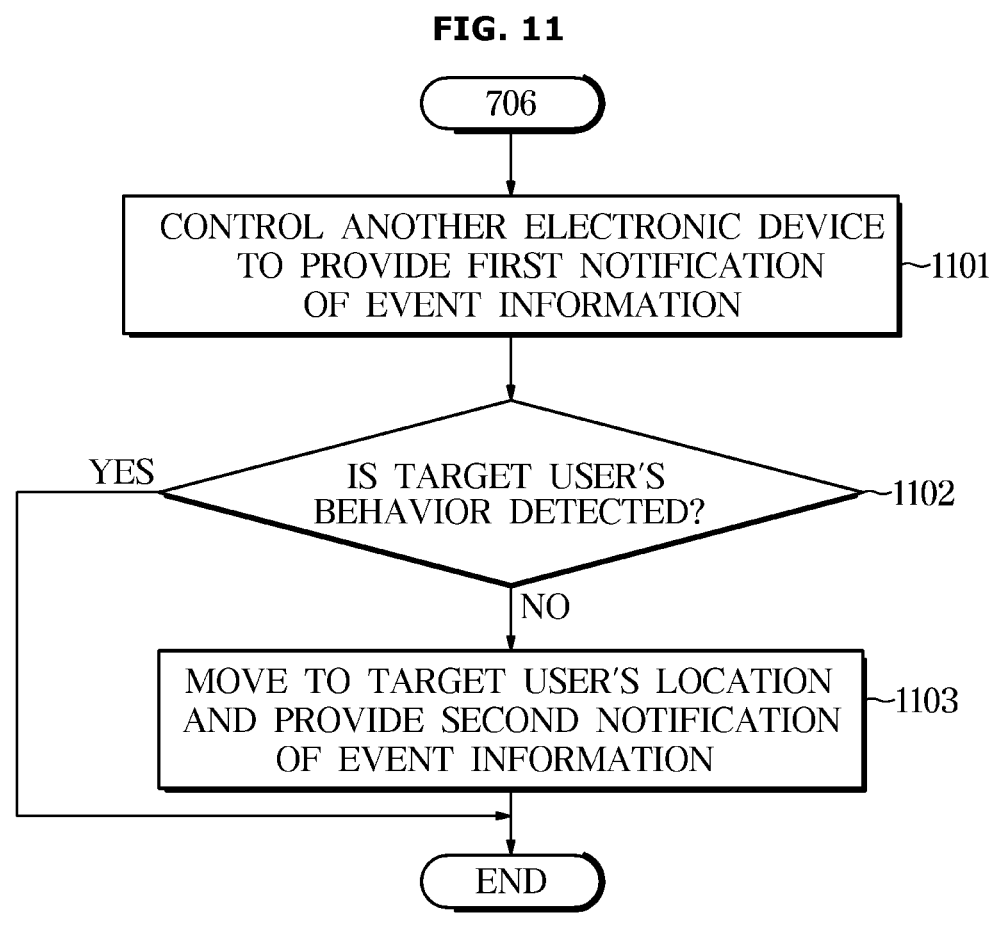

CONTROL ANOTHER ELECTRONIC DEVICE
TO PROVIDE FIRST NOTIFICATION
OF EVENT INFORMATION ~1101

IS TARGET USER'S
BEHAVIOR DETECTED? ~1102

YES

NO

MOVE TO TARGET USER'S LOCATION
AND PROVIDE SECOND NOTIFICATION
OF EVENT INFORMATION ~1103

END

MOBILE ROBOT AND METHOD FOR CONTROLLING MOBILE ROBOT

CROSS-REFERENCE TO RELATED APPLICATION(S)

This application is a continuation application, claiming priority under § 365(c), of an International application No. PCT/KR2024/001346, filed on Jan. 29, 2024, which is based on and claims the benefit of a Korean patent application number 10-2023-0050337, filed on Apr. 17, 2023, in the Korean Intellectual Property Office, and of a Korean patent application number 10-2023-0091390, filed on Jul. 13, 2023, in the Korean Intellectual Property Office, the disclosure of each of which is incorporated by reference herein in its entirety.

BACKGROUND

1. Field

The disclosure relates to a mobile robot capable of autonomous driving, and a method for controlling the mobile robot.

2. Description of Related Art

Robots have been developed for industrial purposes and have been a part of factory automation. Recently, the application of robots has expanded to include medical robots, aerospace robots, service robots, and the like, and domestic robots for use at home are also being produced. Among the robots, robots capable of autonomously driving are referred to as mobile robots (moving robots).

A representative example of mobile robot is a robot cleaner that cleans an indoor space. The mobile robot may move through an indoor space, identify objects located in the indoor space, and generate a map of the indoor space. The mobile robot may use the map of the indoor space to clean the indoor space. The mobile robot may also collect environmental data of the indoor space.

In addition, the mobile robot and other electronic devices may be connected to each other using a home network or various communication means, and may exchange state information, operation information, and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a mobile robot user with information related to an operation of an electronic device other than a user device, even when the user is not in possession of the user device.

Another aspect of the disclosure is to provide a mobile robot that determine whether a user is in a suitable situation to receive information related to an operation of an electronic device, and the information related to the operation of the electronic device in a notification type suitable to the user's situation.

Additional aspects will be set forth in part in the description which follows and, in part, will be apparent from the description, or may be learned by practice of the presented embodiments.

In accordance with an aspect of the disclosure, a mobile robot is provided. The mobile robot includes a communication circuitry configured to communicate with an electronic device, a sensor configured to detect a user, a user interface configured to provide information related to an operation of the electronic device, and a controller configured to be electrically connected to the communication circuitry, the sensor and the user interface. The controller may be configured to determine a target user to provide the information related to the operation of the electronic device, based on at least one of state information of the electronic device or user information obtained by the sensor, obtain event information about a change in the operation of the electronic device, determine a notification type of the event information, based on at least one of a location of the target user or a state of the target user, and control the user interface to provide the event information in the determined notification type.

In accordance with another aspect of the disclosure, a method for controlling a mobile robot is provided. The method includes obtaining state information of an electronic device through a communication circuitry, detecting a user by a sensor to obtain user information, determining a target user to provide information related to an operation of the electronic device, based on at least one of the state information of the electronic device or the user information, obtaining event information about a change in the operation of the electronic device, determining a notification type of the event information, based on at least one of a location of the target user or a state of the target user, and providing the event information in the determined notification type through at least one of a user interface of the mobile robot or another electronic device.

The mobile robot and the method for controlling the mobile robot tracks a user and provide information related to an operation of an electronic device other than a user device, even when the user is not in possession of the user device.

The mobile robot and the method for controlling the mobile robot determines whether a user is in a suitable situation to receive information related to an operation of an electronic device, and provide the information related to the operation of the electronic device in a notification type suitable to the user's situation, thereby improving user convenience.

In accordance with another aspect of the disclosure, one or more non-transitory computer-readable storage media storing computer-executable instructions that, when executed by one or more processors of a mobile robot, cause the mobile robot to perform operations are provided. The operations include obtaining state information of an electronic device through a communication circuitry, detecting a user by a sensor to obtain user information, determining a target user to provide information related to an operation of the electronic device, based on at least one of the state information of the electronic device or the user information, obtaining event information about a change in the operation of the electronic device, determining a notification type of the event information, based on at least one of a location of the target user or a state of the target user, and providing the event information in the determined notification type through at least one of a user interface of the mobile robot or another electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 3 illustrates a side view of a mobile robot shown in FIG. 2 according to an embodiment of the disclosure;

FIG. 11 is a flowchart illustrating a method of providing event information described in FIG. 7 according to an embodiment of the disclosure.

Throughout the drawings, it should be noted that like reference numbers are used to depict the same or similar elements, features, and structures.

DETAILED DESCRIPTION

Figure 1:
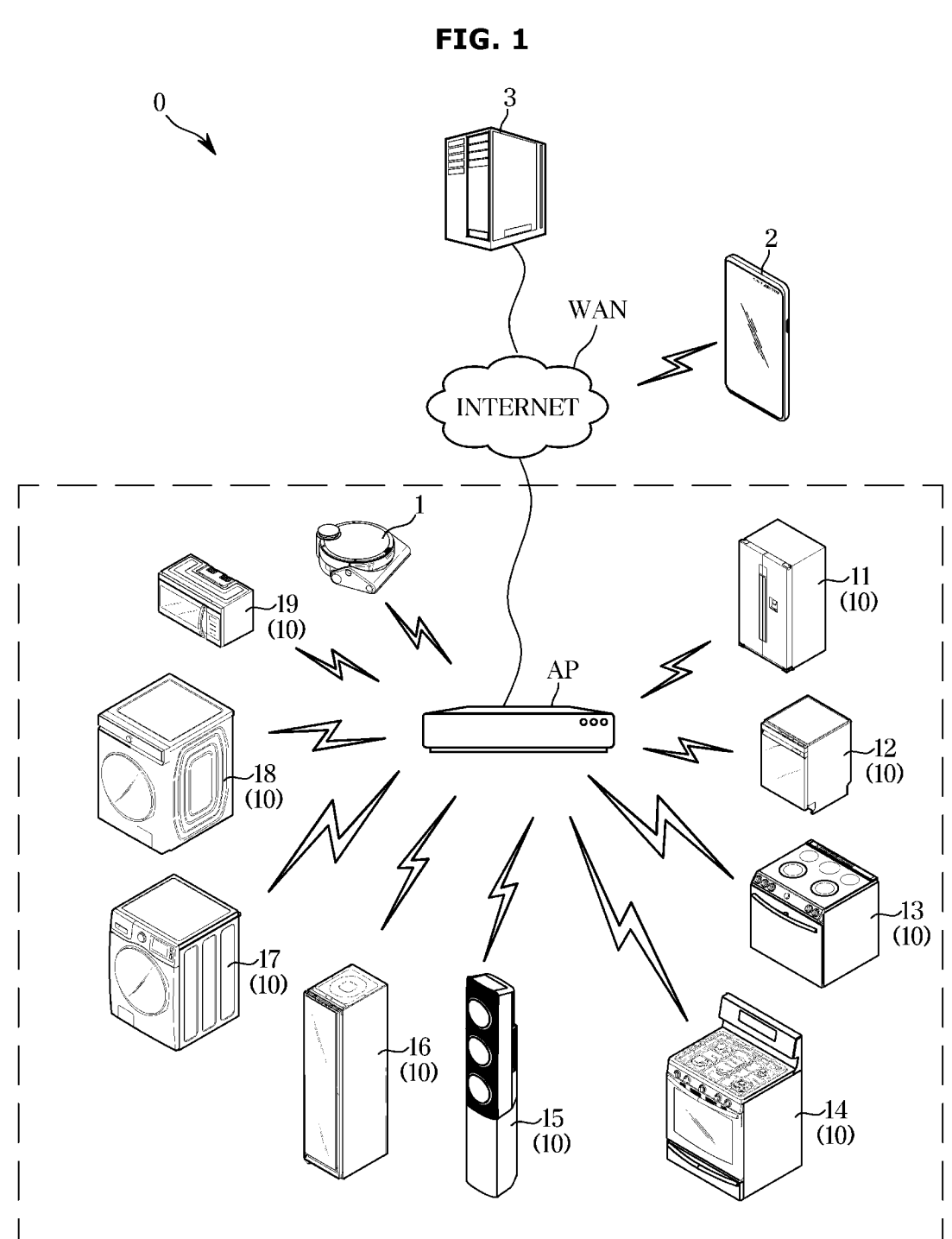
FIG. 1 illustrates a network system including a mobile robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

For example, it will be understood that the term "at least one of a, b, or c" may include only a, only b, only c, both a and b, both a and c, both b and c, or all of a, b and c.

It will be understood that the terms "first", "second", or the like, may be used only to distinguish one component from another, not intended to limit the corresponding component in other aspects (e.g., importance or order).

When it is said that one (e.g., first) component is "coupled" or "connected" to another (e.g., second) component, with or without the terms "functionally" or "communicatively", it means that one component can be connected to the other component directly (e.g., by wire), wirelessly, or through a third component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

An expression that one component is "connected", "coupled", "supported", or "in contact" with another component includes a case in which the components are directly "connected", "coupled", "supported", or "in contact" with each other and a case in which the components are indirectly "connected", "coupled", "supported", or "in contact" with each other through a third component.

It will also be understood that when one component is referred to as being "on" or "over" another component, it can be directly on the other component or intervening components may also be present.

The term "and/or" includes any and all combinations of one or more of a plurality of associated listed items.

Hereinafter, an embodiment of the disclosure is described with reference to the accompanying drawings.

Hereinafter, an operation principle and embodiments of the disclosure will be described with reference to the accompanying drawings.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a network system including a mobile robot according to an embodiment according to an embodiment of the disclosure.

Referring to FIG. 1, a network system 0 according to an embodiment of the disclosure may include a mobile robot 1, a user device 2, a server 3, and home appliance 10.

The mobile robot 1 may include a communication module capable of communicating with the user device 2, the server 3, and the home appliance 10, respectively, a user interface receiving a user input or outputting information to a user, at least one processor controlling an operation of the mobile robot 1, and at least one memory storing a program for controlling the operation of the mobile robot 1.

The home appliance 10 may include various types of electronic devices. For example, the home appliance 10 may include at least one of a refrigerator 11, a dishwasher 12, an electric range 13, an electric oven 14, an air conditioner 15, a clothing care apparatus 16, a washing machine 17, a dryer 18, or a microwave oven 19. The aforementioned home appliances are only examples, and in addition to the aforementioned home appliances, other types of electronic devices, such as a vacuum cleaner or a television may be included in the home appliance 10.

The server 3 may include a communication module communicating with the mobile robot 1, another server, the user device 2, and the home appliance 10, respectively. The server 3 may include at least one processor processing data received from the mobile robot 1, the other server, the user device 2, and the home appliance 10, and at least one memory storing programs for processing data or processed data. The server 3 may be implemented as a variety of computing devices, such as a workstation, a cloud, a data drive, a data station, and the like. The server 3 may be implemented as one or more server physically or logically separated based on a function, detailed configuration of function, or data, and may transmit and receive data through communication between servers and process the transmitted and received data.

The server 3 may perform functions, such as managing a user account, registering the mobile robot 1 and the home appliance 10 in association with the user account, managing or controlling the registered mobile robot 1 and home appliance 10. For example, a user may access the server 3 via the user device 2 and may generate a user account. The user account may be identified by an identifier (ID) and a password set by the user. The server 3 may register the mobile robot 1 to the user account according to a predetermined procedure. For example, the server 3 may link identification information of the mobile robot 1 (such as a serial number or MAC address) to the user account to register, manage, and control the mobile robot 1. The server 3 may register and control the home appliance 10 to the user account.

The user device 2 may include a communication module capable of communicating with the mobile robot 1, the server 3, and the home appliance 10, respectively. The user device 2 may include a user interface receiving a user input or outputting information to a user. The user device 2 may include at least one processor controlling an operation of the user device 2, and at least one memory storing a program for controlling the operation of the user device 2.

The user device 2 may be carried by a user, or placed in a user's home or office, or the like. The user device 2 may include a personal computer, a terminal, a portable telephone, a smartphone, a handheld device, a wearable device, a display, and the like, without being limited thereto.

The memory of the user device 2 may store a program for controlling other mobile robot 1, i.e., an application. The application may be sold installed on the user device 2, or may be downloaded from an external server for installation.

By executing the application installed on the user device 2 by a user, the user may access the server 3, generate a user account, and perform communication with the server 3 based on the login user account to register the mobile robot 1. The home appliance 10 may be registered through the application of the user device 2.

For example, by operating the mobile robot 1 to enable the mobile robot 1 to access the server 3 according to a procedure guided by the application installed on the user device 2, the server 3 may register the mobile robot 1 with the user account by assigning the identification information (such as a serial number or MAC address) of the mobile robot 1 to the corresponding user account. The home appliance 10 may also be registered to the user account in the same manner.

A user may control the mobile robot 1 and the home appliance 10 using the application installed on the user device 2. For example, by logging into a user account with the application installed on the user device 2, the mobile robot 1 and the home appliance 10 registered in the user account appears, and by inputting a control command for the mobile robot 1 or the home appliance 10, the user device 2 may transmit a control command to the mobile robot 1 or the home appliance 10 via the server 3.

A network may include both a wired network and a wireless network. The wired network may include a cable network or a telephone network, and the wireless network may include any networks transmitting and receiving a signal via radio waves. The wired network and the wireless network may be connected to each other.

The network may include a wide area network (WAN), such as the Internet, a local area network (LAN) formed around an access point (AP), and a short range wireless network not using an AP. The short range wireless network may include Bluetooth™ (institute of electrical and electronics engineers (IEEE) 802.15.1), Zigbee (IEEE 802.15.4), wireless fidelity (Wi-Fi) direct, near field communication (NFC), and Z-Wave, without being limited thereto.

The AP may connect the mobile robot 1, the user device 2, or the home appliance 10 on a WAN connected to the server 3. The mobile robot 1, the user device 2, or the home appliance 10 may be connected to the server 3 via a WAN.

The AP may communicate with the mobile robot 1, the user device 2, or the home appliance 10 using wireless communication, such as Wi-fi™ (IEEE 802.11), Bluetooth™ (IEEE 802.15.1), Zigbee (IEEE 802.15.4), or the like, and access a WAN using wired communication, without being limited thereto.

According to various embodiments of the disclosure, the mobile robot 1 may be directly connected to the user device 2, the server 3, or the home appliance 10 without going through an AP. The mobile robot 1 may be connected to the user device 2, the server 3, or the home appliance 10 via a long range wireless network or a short range wireless network.

For example, the mobile robot 1 may be connected to the user device 2 via a short range wireless network (e.g., wi-fi direct). In another example, the mobile robot 1 may be connected to the user device 2, the server 3, or the home appliance 10 via a WAN using a long range wireless network (e.g., a cellular communication module).

In still another example, the mobile robot 1 may access a WAN using wired communication, and may be connected to the user device 2, the server 3, or the home appliance 10 via a WAN. Upon accessing a WAN using wired communication, the mobile robot 1 may also act as an access point.

The mobile robot 1 may transmit information about an operation or state to the user device 2, the server 3, or the home appliance 10 via the network. For example, the mobile robot 1 may transmit information about an operation or state to the user device 2, the server 3, or the home appliance 10 upon receiving a request from the server 3, in response to an event in the mobile robot 1, or periodically or in real time.

In response to receiving the information about the operation or state from the mobile robot 1 or the home appliance 10, the server 3 may update the stored information about the operation or state of the mobile robot 1 or the home appliance 10, and may transmit the updated information about the operation and state of the mobile robot 1 or the home appliance 10 to the user device 2 via the network. Here, updating the information may include various operations in which existing information is changed, such as adding new information to the existing information, replacing the existing information with new information, and the like.

The mobile robot 1 may obtain various information from the user device 2, the server 3, or the home appliance 10, and may provide the obtained information to a user. For example, the mobile robot 1 may obtain information related to a function of the mobile robot 1 from the server 3 and various environment information (e.g., weather, temperature, humidity, or the like), and may output the obtained information via a user interface.

The mobile robot 1 or the home appliance 10 may operate according to a control command received from the user device 2 and the server 3. For example, the mobile robot 1 may operate in accordance with a control command received from the server 3, based on a prior authorization obtained from a user to operate in accordance with the control command of the server 3 even without a user input. Here, the control command received from the server 3 may include a control command input by the user via the user device 2 or a control command based on preset conditions, without being limited thereto.

The user device 2 may transmit information about a user to the mobile robot 1, the server 3, or the home appliance 10 through the communication module. For example, the user device 2 may transmit information about a user's location, a user's health status, a user's preference, a user's schedule, or the like, to the server 3. The user device 2 may transmit information about the user to the server 3 based on the user's prior authorization.

The mobile robot 1, the user device 2, the server 3, or the home appliance 10 may use artificial intelligence to determine a control command. For example, the server 3 may process information about an operation or a state of the mobile robot 1 or the home appliance 10 and information about a user of the user device 2 using techniques, such as artificial intelligence (AI), and may transmit a processing result or a control command to the mobile robot 1, the user device 2, or the home appliance 10 based on the processing result.

The mobile robot 1 may include a robot capable of autonomous driving. The mobile robot 1 may be exemplified as a robot cleaner (cleaning robot) capable of cleaning an indoor space. However, the mobile robot 1 is not limited to a robot cleaner, and may have various forms.

Figure 2:
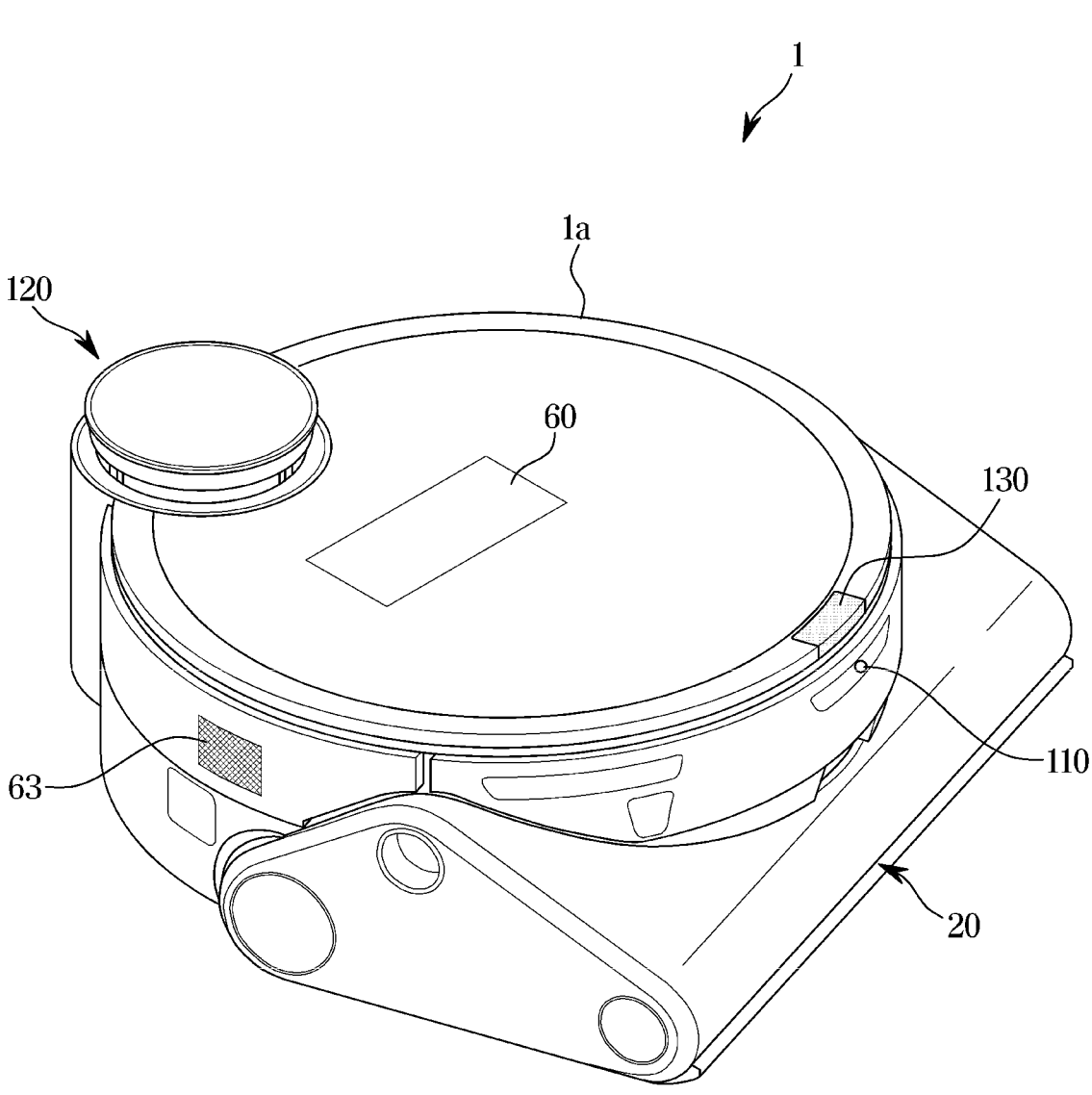
FIG. 2 illustrates a mobile robot according to an embodiment of the disclosure.

FIG. 2 illustrates a mobile robot according to an embodiment according to an embodiment of the disclosure.

Figure 3:
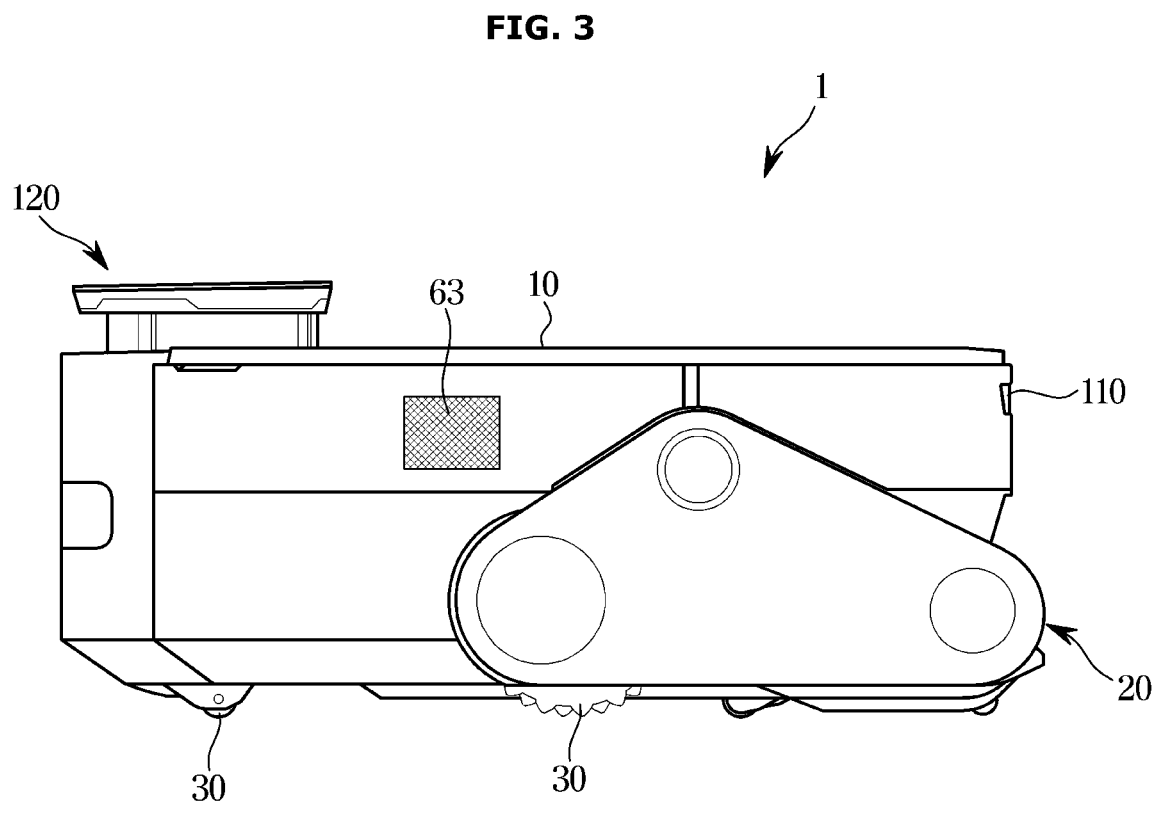

FIG. 3 illustrates a side view of a mobile robot shown in FIG. 2 according to an embodiment of the disclosure.

Referring to FIGS. 2 and 3, the terms "forward (or front)", "rearward (or back)", "upward (or up), "downward (or down)", "left" and "right" are defined with respect to a direction in which the mobile robot 1 moves forward, but the terms may not restrict the shapes and positions of the respective components. Furthermore, an expression that indicates a direction is used to clearly understand the disclosure, and the direction may be defined otherwise.

Referring to FIGS. 2 and 3, the mobile robot 1 may include a main body 1a, and a wheel 30 arranged to be rotatable around an axis parallel to the ground to move the main body 1a. The main body 1a may include a case that defines an external appearance. A plurality of wheels 30 may be arranged. For example, two or more wheels 30 may be arranged underneath the main body 1a. The wheel 30 may include a wheel motor, and may rotate according to rotational force generated by the wheel motor.

A brush assembly 20 may be provided on the front of the main body 1a. A brush may scatter debris present in a travel route of the main body 1a. The brush may be located at an intake port formed on a bottom surface of the main body 1a, and scatter the debris to the inside of the intake port while rotating around a rotation axis perpendicular to a forward direction of the main body 1a. An intake fan 40 for generating a suction power to draw in the debris and a dust container for storing the debris may be arranged in the main body 1a.

A user interface 60 may be provided on the main body 1a. The user interface 60 may be located at various positions on the main body 1a. The user interface 60 may obtain a user input. The user interface 60 may provide various information about operations of the mobile robot 1. The user interface 60 may include at least one of an inputter 61, a display 62 or a speaker 63.

The mobile robot 1 may output various effective sounds and/or voices through the speaker 63. For example, a voice including information related to an operation of the home appliance 10 may be output through the speaker 63.

The mobile robot 1 may include a variety of sensors. For example, the mobile robot 1 may include at least one of a camera 110, a light detection and ranging (lidar) sensor 120, or an audio sensor 130. The sensors may be located in the main body 1a. At least some of the sensors may be arranged to be exposed to the outside of the main body 1a.

The camera 110 may be provided on the front of the main body 1a. The camera 110 may generate an image with a field of view (FOV) toward the front of the main body 1a. A location of the camera 110 is not limited to the front of the main body 1a. The camera 110 may be provided at various positions to capture surroundings of the mobile robot 1. The camera 110 may be located on a side and/or back of the main body 1a.

The camera 110 may include an image sensor for generating image information by collecting incident light from the outside. For example, the camera 110 may include at least one of a red-green-blue (RGB) camera for generating a color image by collecting visible rays, or an infrared camera for generating an infrared image. The camera 110 may include a binocular camera (stereo camera). The binocular camera may obtain information about depth to an object by using binocular disparity. The image information obtained by the camera 110 may be transmitted to a controller 200 of the mobile robot 1. The controller 200 may identify an external object by processing the image information.

The lidar sensor 120 may emit light (pulse laser) to the outside, and receive light of a preset direction among rays reflecting from an external object. The lidar sensor 120 may rotate 360 degrees clockwise or counterclockwise. The lidar sensor 120 may emit light and receive reflected light at 360 degrees, and thus the mobile robot 1 may use the lidar sensor 120 to detect external objects from all directions.

Lidar data generated by the lidar sensor 120 may be transmitted to the controller 200 of the mobile robot 1. The lidar data may include light propagation direction information and information about a distance to an external object. The controller 200 may process the lidar data to perform three-dimensional (3D) modeling of an indoor space. The controller 200 may process the lidar data to obtain 3D data of an external object.

The audio sensor 130 may detect external sound. The audio sensor 130 may detect a user's voice. The audio sensor 130 may include a microphone. The audio sensor 130 may generate audio information by detecting a sound signal and/or a voice signal.

In addition to the above, various sensors may be provided in the mobile robot 1. For example, the mobile robot 1 may further include at least one of a shock sensor for detecting shocks with external objects, a gyro sensor for detecting motion of the mobile robot 1, an inertial measurement unit (IMU) for detecting acceleration, speed and direction of the mobile robot 1, a time-of-flight (ToF) sensor for measuring a distance to an external object, a radio frequency (RF) sensor, an ultrasound sensor, or a radar sensor.

Figure 4:
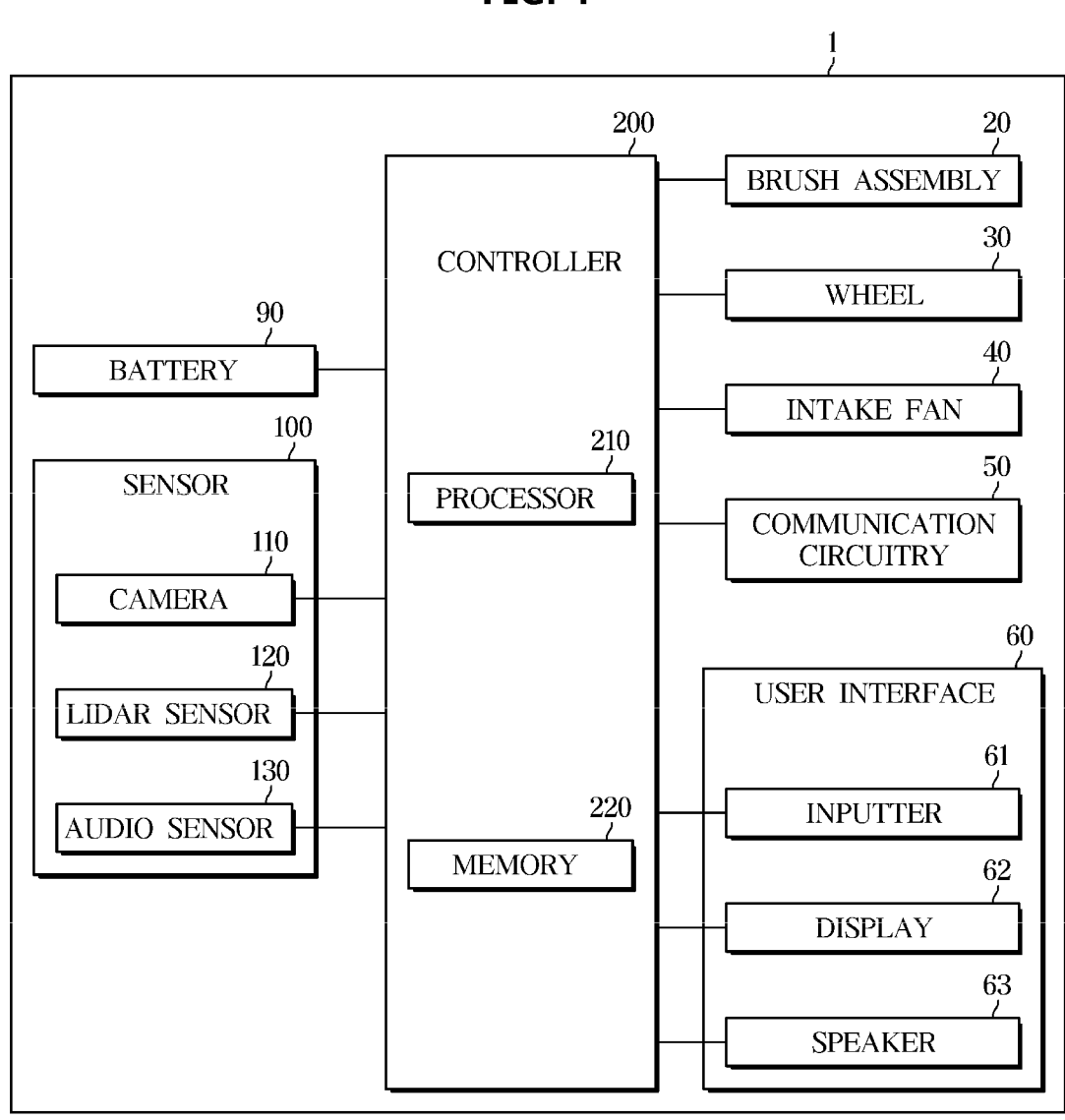
FIG. 4 is a control block diagram of a mobile robot according to an embodiment of the disclosure.

FIG. 4 is a control block diagram of a mobile robot according to an embodiment according to an embodiment of the disclosure.

Referring to FIG. 4, the mobile robot 1 may include the wheel 30, a communication circuitry 50, the user interface 60, a battery 90, a sensor 100, and the controller 200. In a case where the mobile robot 1 is a robot cleaner, the mobile robot 1 may further include the brush assembly 20 and the intake fan 40. As described above, the mobile robot 1 is not limited to a robot cleaner.

The controller 200 may control components of the mobile robot 1. The controller 200 may include a processor 210 and memory 220. The processor 210 may include logic circuits and operation circuits in hardware. The processor 210 may control the electrically connected components of the mobile robot 1 based on a program, instructions and/or data stored in the memory 220 for an operation of the mobile robot 1. The controller 200 may be implemented with a control circuit including circuit elements, such as a condenser, an inductor and a resistor. The processor 210 and the memory 220 may be implemented in separate chips or in a single chip. Furthermore, the controller 200 may include a plurality of processors and a plurality of memories.

The memory 220 may store the program, application and/or data for the operation of the mobile robot 1, and store data generated by the processor 210. The memory 220 may include non-volatile memory, such as read only memory (ROM) and flash memory for storing the data for a long time. The memory 220 may include volatile memory for temporarily storing data, such as static random-access memory (SRAM) and dynamic random access memory (DRAM).

The brush assembly 20 may include a brush and a brush motor. A rotational force generated by the brush motor may rotate the brush. A rotation speed of the brush may be controlled by controlling a rotation speed of the brush motor. A degree of scattering debris in a travel route of the mobile robot 1 may vary depending on the rotation speed of the brush.

The wheel 30 may move the main body 1*a*. The wheel 30 may include a wheel motor, and may rotate according to a rotational force generated by the wheel motor. The wheel 30 may be provided in a plurality, and each of the plurality of wheels may be controlled separately. As a direction in which the plurality of wheels rotate is changed, a direction in which the mobile robot 1 travels may be changed. Furthermore, a speed of the mobile robot 1 may be controlled by controlling a rotation speed of each of the plurality of wheels.

The intake fan 40 may draw in the debris scattered by the brush assembly 20 to be moved into the dust container. The intake fan 40 may rotate according to a rotational force of an intake motor, and the rotation of the intake fan 40 may generate a suction power to draw in the debris. The suction power may be controlled by controlling the rotation speed of the intake fan 40.

The communication circuitry 50 may perform connection with at least one of the user device 2, the server 3, or the home appliance 10 via a network. The controller 200 may obtain various information, various signals and/or various data from the user device 2, the server 3, and the home appliance 10 through the communication circuitry 50. For example, the communication circuitry 50 may receive a remote control signal from the user device 2. The controller 200 may obtain an AI model used to process various data from the server 3 through the communication circuitry 50.

The controller 200 may obtain state information of the home appliance 10 from the home appliance 10 or the server 3 through the communication circuitry 50. The state information of the home appliance 10 may include various information, such as identifier, type, location, whether the home appliance 10 is currently in operation, operation mode, operation time, and whether a failure occurs in the home appliance 10.

The communication circuitry 50 may include various communication circuits. The communication circuitry 50 may include a wireless communication circuit. The wireless communication circuit may support various wireless communication, such as a wireless local area network (LAN), home radio frequency (RF), infrared communication, ultra-wide band (UWB) communication, wi-fi, Bluetooth, Zigbee and a long range wireless network (e.g., cellular communication). The communication circuitry 50 may further include a wired communication circuit.

The user interface 60 may obtain a user input. The user interface 60 may provide various information about operations of the mobile robot 1. The user interface 60 may provide various information related to operations of the home appliance 10. The user interface 60 may include at least one of the inputter 61, the display 62 or the speaker 63.

The inputter 61 may obtain a user input. The user input may include a variety of commands. For example, the inputter 61 may obtain a power-on command, a power-off command, an operation start command, an operation stop command, or a charge command. The user input may be obtained from the user device 2. The inputter 61 may transmit, to the controller 200, an electrical signal (voltage or current) corresponding to the user input.

The inputter 61 may include at least one of various buttons or a dial. For example, the inputter 61 may include at least one of a power button to power on or off the mobile robot 1, a start/stop button to start or stop movement, or a docking button to force the mobile robot 1 to return to a charging station. The buttons may be provided as physical buttons or touch buttons.

The display 62 may display information related to an operation of the mobile robot 1. The display 62 may provide information related to an operation of another electronic device (e.g., the home appliance 10). The display 62 may display information input by a user or information to be provided to the user in various screens. The display 62 may display various information in at least one of an image or text. For example, the display 62 may output battery information. Furthermore, the display 62 may display a graphic user interface (GUI) that enables the mobile robot 1 to be controlled. In other words, the display 62 may display a user interface element (UI element), such as an icon.

The display 62 may be provided in various types of display panels. For example, the display 62 may include a liquid crystal display (LCD) panel, a light emitting diode (LED) panel, an organic light emitting diode (OLED) panel, or a micro LED panel. The display 62 may include a touch display that serves as an input device as well.

The display 62 and the inputter 61 may be provided separately or in a single device (e.g., the touch display).

The speaker 63 may output information input by a user or information provided to the user in various sounds and/or voices. For example, the controller 200 may control the speaker 63 to output various sounds about an operation state of the mobile robot 1 and an operation state of the home appliance 10.

The battery 90 may supply power to various electronic components included in the mobile robot 1. For example, the battery 90 may supply power to each of the wheel 30, the intake fan 40, the communication circuitry 50, the user interface 60, the sensor 100 and the controller 200. The power supplied from the battery 90 may be transformed by the controller 200 and then supplied to the respective electronic components.

The sensor 100 may include an image sensor for obtaining image information with a field of view toward the outside of the main body 1*a*. The camera 110 and the lidar sensor 120 may be included in the image sensor. The sensor 100 may include a non-image sensor detecting an external object, external sound, and/or a motion of the mobile robot 1. The audio sensor 130 may be included in the non-image sensor. The non-image sensor may further include at least one of a radar sensor for detecting an external object, a wheel sensor for detecting a rotation speed of the wheel 30, a gyro sensor for detecting a change in posture of the main body 1*a*, or an IMU for detecting acceleration, speed and direction of the mobile robot 1.

The camera 110 may obtain image data with a field of view toward a forward direction of the main body 1*a*. The camera 110 may transmit the image data to the controller 200. The controller 200 may process the image data obtained by the camera 110 to generate an image that may be displayed through the display 62 and the user device 2. An image may include a plurality of image frames obtained at predetermined intervals. In other words, a video may be generated by arranging a plurality of image frames in a time series.

The lidar sensor 120 may obtain lidar data with omnidirectional fields of view of the main body 1*a*. The lidar sensor 120 may transmit the lidar data to the controller 200. The controller 200 may process the lidar data to generate a lidar image.

The audio sensor 130 may detect an external sound, such as a user's voice. The audio sensor 130 may include a microphone. The audio sensor 130 may convert the user's voice, which is an analog signal, into a data signal and transmit the data signal to the controller 200. The controller 200 may identify a command included in the user's voice by analyzing the user's voice, and may control an operation of the mobile robot 1 based on the identified command. The controller 200 of the mobile robot 1 may identify a control command for controlling an electronic device from the user's voice input through the microphone. The controller 200 may transmit the control command to the electronic device through the communication circuitry.

The sensor 100 may generate sensing information about each of the user and electronic device. The sensing information may include at least one of image information or audio information. For example, the sensor 100 may generate image information including at least one of the user or the electronic device. The image information may include at least one of image data obtained by the camera 110 or lidar data obtained by the lidar sensor 120. The audio sensor 130 may generate audio information corresponding to each of the user's voice and a sound of the electronic device.

The controller 200 may control an operation of the mobile robot 1 based on a command received through at least one of the inputter 61, the display 62, the audio sensor 130, or the user device 2.

The controller 200 may control driving of the mobile robot 1 based on at least one of the image data obtained by the camera 110 or the lidar data obtained by the lidar sensor 120. The controller 200 may process at least one of the image data obtained by the camera 110 or the lidar data obtained by the lidar sensor 120 to identify various objects located around the mobile robot 1.

The controller 200 may use an AI model obtained from the memory 220 or the server 3 to identify an external object from at least one of the image data or the lidar data, and may detect a feature of the external object. For example, the controller 200 may detect a size, shape, brightness, definition, transparency, position and/or color of the external object. In addition, the controller 200 may estimate a distance to the external object and a height of the external object by using depth information included in at least one of the image data or the lidar data. The controller 200 may identify an obstacle in a travel route of the mobile robot 1 by processing at least one of the image data or the lidar data, and may control the wheel 30 to avoid the obstacle.

The camera 110 and the lidar sensor 120 are described as, but not limited to, a sensor for identifying an external object. An external object may be identified from data obtained using various sensors, such as an ultrasound sensor or a radar sensor.

The components of the mobile robot 1 are not limited to those shown in FIG. 4. Some of the components shown in FIG. 4 may be omitted or other components may be added to the mobile robot 1.

The controller 200 of the mobile robot 1 may identify a plurality of zones in an indoor space based on various data obtained by the sensor 100 while the mobile robot 1 is traveling in the indoor space, and may generate a map of the indoor space including the plurality of zones. The controller 200 may generate various types of maps of the plurality of zones in the indoor space based on the various data obtained by the sensor 100.

For example, the controller 200 may generate a reference map of the indoor space by using at least one of image data or lidar data obtained while the mobile robot 1 is traveling in the indoor space, and may identify a location of the mobile robot 1 in the indoor space. To generate the reference map, a simultaneous localization and mapping (SLAM) algorithm may be used. The SLAM is an algorithm capable of making a map of the space in which the mobile robot 1 is traveling and simultaneously, estimating a location of the mobile robot 1 in the map.

The reference map may include structural information of the indoor space. For example, the reference map may represent a shape and location of structures, such as walls and floors, and may represent a type, size, and location of each object located within the indoor space. The mobile robot 1 may identify a location of an electronic device by detecting a signal (e.g., Bluetooth low energy (BLE) signal, wi-fi signal, RF signal, or the like) emitted by the electronic device present in the indoor space, and may map the location of the electronic device to the reference map. The reference map may be stored in the memory 220. The controller 200 may update the reference map at predetermined intervals or each time a changed indoor structure is detected.

The reference map may also be generated by the server 3. The mobile robot 1 may transmit the various data obtained by the sensor 100 to the server 3. The server 3 may process the data received from the mobile robot 1 to generate the reference map, and may transmit the generated reference map to the mobile robot 1 and the user device 2.

The controller 200 may obtain state information of an electronic device (e.g., the home appliance 10) through the communication circuitry 50. The state information of the electronic device may include various information about the electronic device, such as an identifier, type, location, whether the electronic device is currently in operation, operation mode, operation time, and whether a failure occurs in the electronic device. The controller 200 may detect an occurrence of an event related to a change in operation of the electronic device based on the state information transmitted from the electronic device. The state information of the electronic device may also be obtained through the sensor 100.

The sensor 100 may detect a user. The controller 200 may obtain information about at least one of the user or the electronic device from the sensor 100. The controller 200 may identify at least one of the user or the electronic device from image information. For example, the controller 200 may identify at least one of the user or the electronic device from an image obtained by the camera 110 using an AI model.

The controller 200 may obtain user information from the sensor 100. The controller 200 may identify a feature of the user's appearance (e.g., a face, a body shape, clothing, or the like) from the image information. The controller 200 may identify a type and size of the electronic device from the image information. The controller 200 may determine whether the identified user is a user registered in a user database based on the feature of the user's appearance identified from the image information. The user database may be stored in the memory 220 or the server 3.

In addition, the controller 200 may obtain audio information corresponding to each of the user's voice and the electronic device's sound from the sensor 100. The controller 200 may extract the user's voice included in the audio information, and may identify a feature of the user's voice. The controller 200 may specify the user based on the feature of the user's voice. For example, the controller 200 may determine whether the identified user is a user registered in the user database based on the feature of the user's voice.

In a case where the user identified from at least one of the image information or the audio information is not registered in the user database, the controller 200 may register the user as a new user.

The controller 200 may determine a target user to provide information related to an operation of the electronic device, based on at least one of the state information of the electronic device obtained through the communication circuitry 50 or the user information obtained by the sensor 100. For example, the target user may be determined as a user related to the operation of the electronic device, another person designated by the user, or a random user searched for in the indoor space.

The controller 200 may determine whether an operation of the electronic device is associated with a user, based on at least one of the image information or the audio information obtained through the sensor 100. For example, the controller 200 may determine a distance between the electronic device and the user based on at least one of the image information or the audio information. Based on the user being located within a predetermined distance from the electronic device, it may be determined that the operation of the electronic device is associated with the user. In addition, the controller 200 may detect a user's gaze from the image information, and may determine whether the operation of the electronic device is associated with the user by considering whether the user's gaze is directed to the electronic device.

The controller 200 may determine the user as the target user or determine to search for another user, based on whether the operation of the electronic device is associated with the user. In a case where a user is identified around the electronic device, the identified user is likely to have operated the electronic device, and thus the mobile robot 1 may determine that the user identified around the electronic device is associated with the operation of the electronic device, and may provide the identified user with event information about a change in the operation of the electronic device.

The controller 200 may obtain user authentication information for operating the electronic device through the electronic device, the user device 2, the sensor 100, or the user interface 60. For example, the user authentication information may include at least one of biometric information (e.g., fingerprint, iris, face, or the like), account information (e.g., login ID, password, or the like), or tag information of the user device 2. The mobile robot 1 may identify a user associated with the operation of the electronic device based on the input user authentication information. The mobile robot 1 may provide the user identified through the user authentication information with event information about a change in the operation of the electronic device.

The controller 200 may output a first query message to confirm whether the identified user is associated with the operation of the electronic device through at least one of the display 62 or the speaker 63. The controller 200 may determine the target user based on a user's response to the first query message. For example, a first query message, such as 'Mr. X, did you just turn on the cooking appliance?' may be output. In response to a positive response from a user who received the first query message, the mobile robot 1 may determine the user who responded as the target user. In a case where the user who received the first query message responds negatively or does not respond, the mobile robot 1 may not determine the target user or may search for another user.

In addition, the controller 200 may output a second query message to confirm whether to provide information related to the operation of the electronic device through at least one of the display 62 or the speaker 63. The controller 200 may determine the target user based on a user's response to the second query message. For example, a second query message, such as 'Mr. X, may I provide you with an operation state of washing machine?' may be output. In response to a positive response from a user who received the second query message, the mobile robot 1 may determine the user who responded as the target user. In a case where the user who received the second query message responds negatively or does not respond, the mobile robot 1 may not determine the target user or may search for another user.

The mobile robot 1 may be set to provide notifications about only some of various pieces of information related to operations of the electronic device, or may be set to provide notifications about entire information related to operations of the electronic device. For example, the mobile robot 1 may be set to provide a notification regarding only an end of washing among various pieces of information related to operations of a washing machine. The controller 200 may determine information to be notified among various pieces of information related to the operations of the electronic device, based on a notification setting command input through the user interface 60, the audio sensor 130, or the user device 2. Notification settings may be performed in advance before the electronic device starts operating, or may be performed according to a target user's response to the second query message after the electronic device starts operating.

After outputting the first query message or the second query message, the controller 200 may receive a user change command from the user through the user interface 60 or the audio sensor 130. The user change command may be included in the user's response to the first query message or the second query message. For example, the user change command may include a voice command, such as 'Tell my husband.' The controller 200 may determine a person (e.g., husband) specified by the user change command as a new target user, and may provide the new target user with event information about a change in operation of the electronic device.

The controller 200 may detect a location of the user device 2 based on a communication signal transmitted from the user device 2. The controller 200 may determine an owner of the user device 2 as a user associated with an operation of the electronic device, based on the user device 2 being located within a short distance from the electronic device. For example, the owner of the user device 2 may be determined as the target user to receive information about the operation of the electronic device.

The controller 200 may identify at least one of a location or a state of a target user from the user information obtained by the sensor 100. For example, the mobile robot 1 may find a target user while traveling through a plurality of zones of an indoor space in a predetermined order using a reference map. In addition, the controller 200 may identify at least one of the location or the state of the target user, based on at least one of image information or audio information transmitted from at least one electronic device (e.g., a home cam, an AI speaker, or the like) located around the target user. Furthermore, the mobile robot 1 may monitor a user's behavior to learn a user's behavior pattern, and based on a behavior pattern of a user determined as the target user, may estimate the location and state of the target user.

The controller 200 may determine a notification type of event information, based on at least one of the location or the state of the identified target user. The controller 200 may determine the notification type as a visual notification through the display 62 of the user interface 60 or an auditory notification through the speaker 63, based on at least one of the location or the state of the target user.

The controller 200 may control the user interface 60 to provide the event information in the determined notification type. In addition, the controller 200 may transmit the event information to at least one other electronic device (e.g., an AI speaker, a display device, or the like) located around the target user, and may control the at least one other electronic device to output the event information.

The controller 200 may determine deliverability of the event information based on at least one of the location or the state of the target user. In other words, the controller 200 may determine whether the target user is able to receive a notification of the event information. Based on a determination that the event information is deliverable to the target user, the mobile robot 1 may provide the event information in the determined notification type.

Based on a determination that the event information is not deliverable to the target user, the controller 200 of the mobile robot 1 may determine to change the target user. For example, in a case where the target user is outdoors or is sleeping in a bedroom, the mobile robot 1 may determine that the event information is not deliverable to the target user. The controller 200 may search for a person other than the target user within a predetermined area based on the determination to change the target user. The controller 200 may control the wheel 30 and the sensor 100 to search for another person. The controller 200 may determine the searched other person, as a new target user. In a case where no other person is found, the controller 200 may not determine the target user and may not provide a notification about the event information.

In a case where a plurality of persons are found as a result of the searching, the controller 200 may determine one of the plurality of persons as the target user, based on a predetermined priority. For example, the controller 200 may prioritize a person registered in the user database and determine the person as the target user. In another example, the controller 200 may determine a first found person as the target user. The controller 200 may prioritize an adult among the plurality of persons found and determine the adult as the target user.

In addition, after providing the notification of event information to the target user, the mobile robot 1 may receive a user change command from the target user through the user interface 60 or the audio sensor 130. For example, the user change command may be input as a voice command, such as 'Tell my husband'. The controller 200 may determine a person specified by the user change command as a new target user, and may provide the new target user with the event information about a change in operation of the electronic device.

The mobile robot 1 may provide the notification of event information to the target user two or more times. For example, the mobile robot 1 may remotely provide a first notification (initial notification) to the target user. After the first notification, the mobile robot 1 may move to a location of the target user, and provide a second notification upon approaching the target user's location.

The controller 200 of the mobile robot 1 may control another electronic device (e.g., an AI speaker, a display device, or the like) located within a predetermined distance from the target user in order to provide the first notification of event information.

The controller 200 may determine whether to provide the second notification of event information through the user interface 60 at the target user's location, based on whether a target user's behavior corresponding to the first notification is detected. The controller 200 may provide the second notification through at least one of the user interface 60 or the speaker 63, based on the target user's behavior not being detected for a predetermined standby time after providing the first notification.

Figure 5:
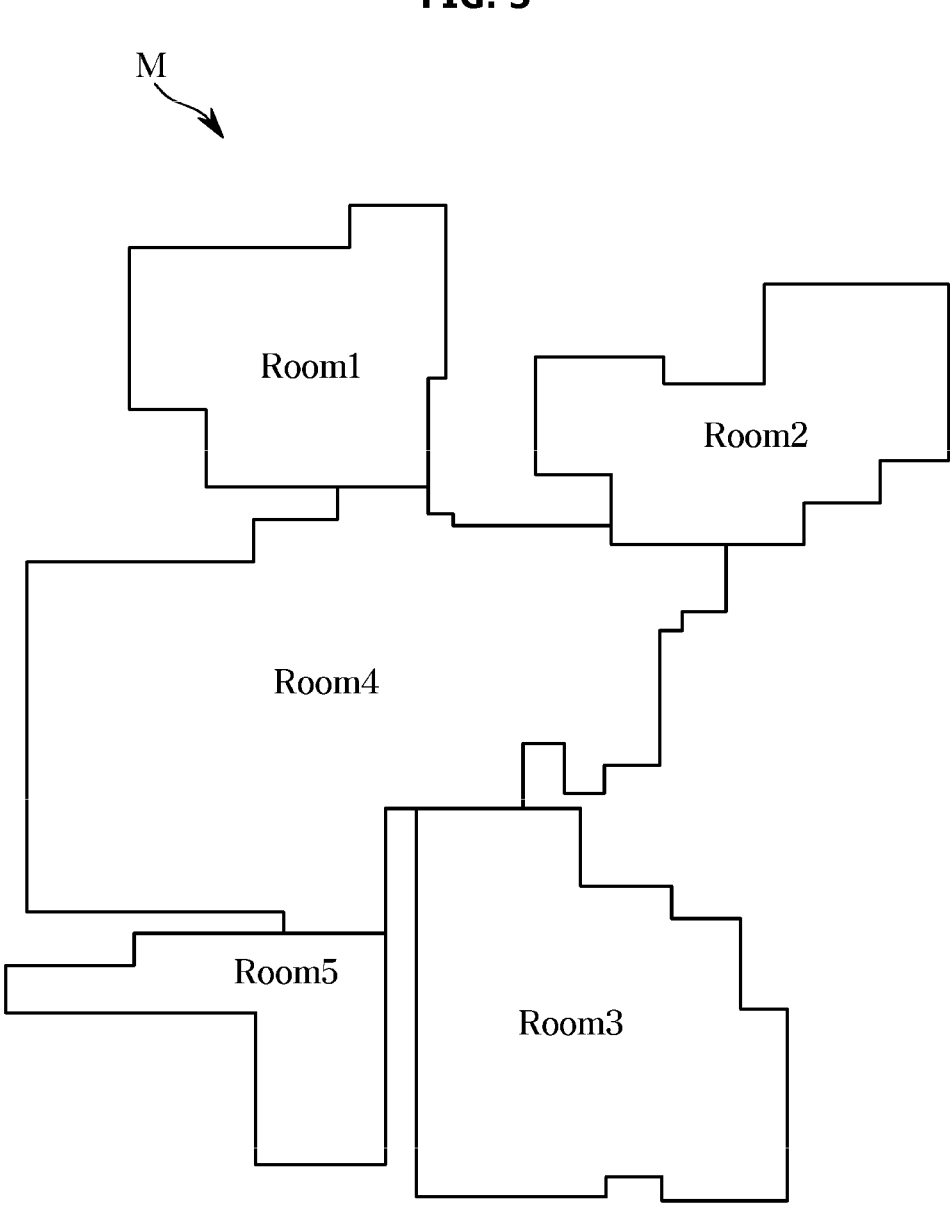
FIG. 5 illustrates a map of an indoor space generated by a mobile robot according to an embodiment of the disclosure.

FIG. 5 illustrates a map of an indoor space generated by a mobile robot according to an embodiment of the disclosure.

Figure 6:
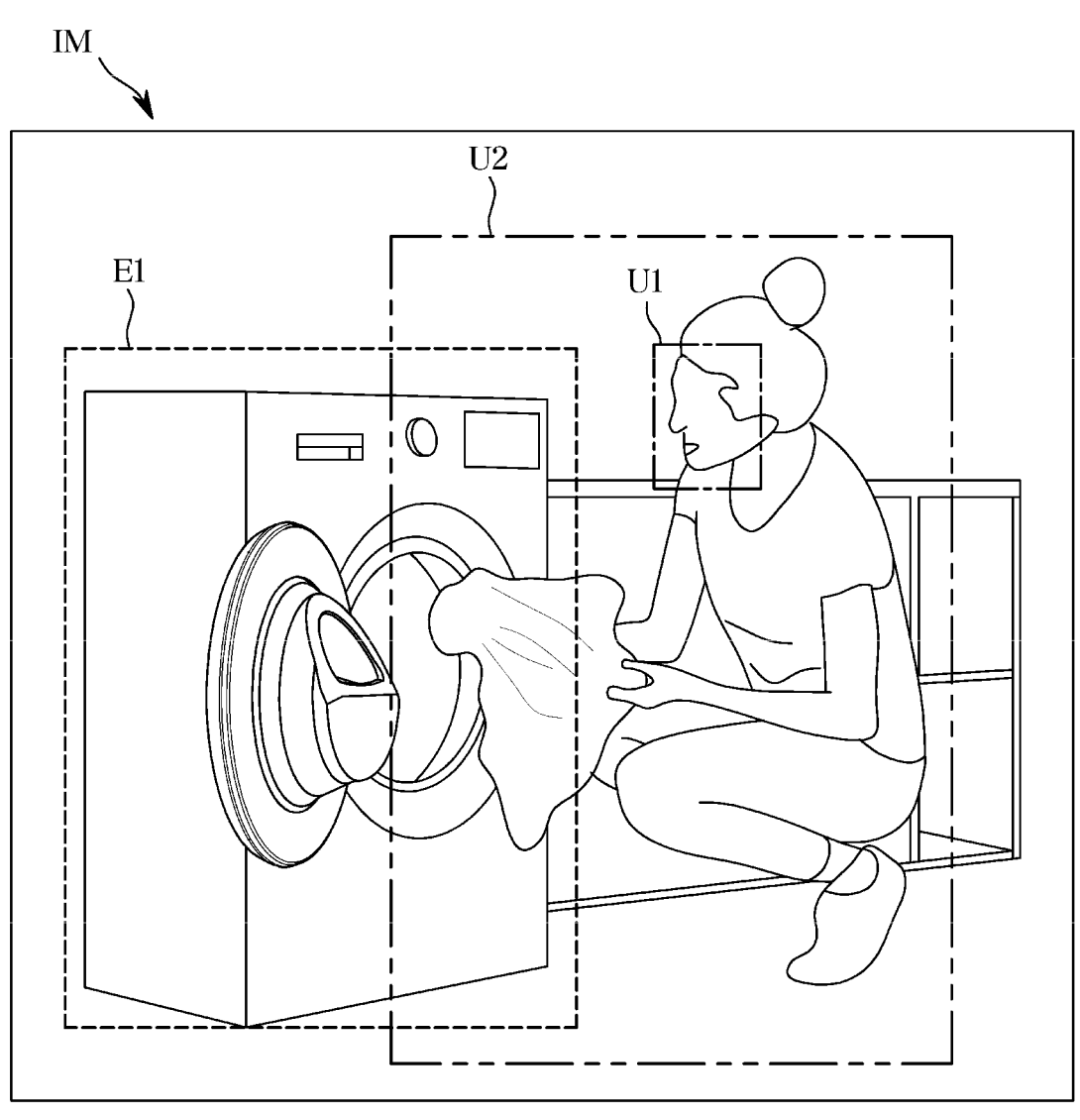
FIG. 6 illustrates an image obtained by a sensor of a mobile robot according to an embodiment of the disclosure.

FIG. 6 illustrates an image obtained by a sensor of a mobile robot according to an embodiment of the disclosure.

Referring to FIG. 5, the mobile robot 1 may generate a map of an indoor space while traveling in the indoor space. The mobile robot 1 may generate a reference map M of the indoor space including a plurality of zones by using at least one of image data or lidar data obtained while traveling in the indoor space. It is illustrated in FIG. 5 that the indoor space is divided into five rooms. The indoor space may be divided into a room 1, a room 2, a room 3, a room 4 and a room 5.

The reference map may include structural information of the indoor space. For example, the reference map may represent a shape and location of structure, such as walls and floors, and may represent a type, size, and location of various objects (e.g., a home appliance) located within the indoor space. The mobile robot 1 may identify a location of an electronic device by detecting a signal (e.g., a BLE signal, a wi-fi signal, an RF signal, or the like) emitted by the electronic device present in the indoor space, and may map the location of the electronic device to the reference map.

The reference map may be generated by the server 3. The mobile robot 1 may transmit various data obtained by the sensor 100 to the server 3. The server 3 may process the data received from the mobile robot 1 to generate the reference map, and may transmit the generated reference map to the mobile robot 1 and the user device 2.

A variety of electronic devices may be located at various locations in the indoor space. For example, the washing machine 17 and the dryer 18 may be located in a laundry room, and cooking appliances, such as the electric range 13, the electric oven 14, and the microwave oven 19 may be located in a kitchen. A single user cannot be physically present in multiple locations in the indoor space at the same time. A single user can only be present in one of the multiple locations in the indoor space.

A user may operate an electronic device (e.g., a cooking appliance, a washing machine, or the like) placed in one location, and then move to another location. In a case where an operation of the previously operated electronic device is changed while the user is in the other location, the user may not immediately recognize the change in the operation of the electronic device. In a case where the user is not in possession of a user device, even though a notifications regarding the change in the operation of the electronic device is provided through the user device, the user may not be able to check the notification.

Various issues may arise because the user is unable to recognize the change in the operation of the electronic device. For example, when the user is unaware that food being heated by the cooking appliance has started to boil, the food may overflow or burn. When the user is unaware of completion of operation of the washing machine 17, laundry may be left unattended in the washing machine 17 for a long time.

The mobile robot 1 according to the disclosure may identify a user related to the operation of the electronic device and provide the identified user with event information about the change in the operation of the electronic device, thereby preventing the above-described situations from occurring.

For example, referring to FIG. 6, the mobile robot 1 may recognize that an electronic device E1 has started operating, based on state information of the electronic device E1 transmitted from the electronic device E1. In response to receiving the state information from the electronic device E1, the mobile robot 1 may move to a location of the electronic device E1. The mobile robot 1 may move to the location of the electronic device E1 using the reference map M.

The mobile robot 1 may obtain an image IM around the electronic device E1 using the sensor 100. The image IM may include a plurality of image frames. The controller 200 of the mobile robot 1 may detect the electronic device E1, a face area U1 of the user located near the electronic device E1, and a movement area U2 of the user from the image IM. The controller 200 of the mobile robot 1 may use an AI model, stored in the memory 220 or the server 3, to detect the electronic device E1, the user's face area U1, and the user's movement area U2 from the image IM.

The mobile robot 1 may obtain biometric information (i.e., facial features) of the user from the user's face area U1 in the image IM, and may specify the user based on the user's biometric information. The mobile robot 1 may identify a behavior state of the user based on the user's movement detected in the user's movement area U2.

The mobile robot 1 may determine that a user identified around a turned-on electronic device E1 is associated with an operation of the electronic device. In addition, because the user detected around the electronic device E1 is performing an action related to the electronic device E1 in a state where the electronic device E1 is turned on, the mobile robot 1 may determine that the identified user is associated with the electronic device E1. The mobile robot 1 may determine the user, identified in the image IM obtained by capturing surroundings of the electronic device E1, as a target user to provide information related to the operation of the electronic device E1.

In addition, the mobile robot 1 may detect a user's voice from audio information obtained through the audio sensor 130 around the electronic device E1. The mobile robot 1 may identify a feature of the detected user's voice, and may specify the user based on the feature of the user's voice. The mobile robot 1 may determine the user, specified around the electronic device E1, as a target user to provide information related to the operation of the electronic device E1.

While the electronic device E1 is operating, the target user may leave the vicinity of the electronic device E1 and move to another location. An event in which the operation of the electronic device E1 changes may occur while the target user is in the other location. The mobile robot 1 may generate event information about the change in the operation of the electronic device E1, move to the target user's location, and provide the event information to the target user. The target user may easily recognize the change in the operation of the electronic device E1 through the event information provided by the mobile robot 1.

As described in FIG. 1, there may be various types of electronic devices. Because an operation of each electronic device is different, information about an electronic device provided to a user by the mobile robot 1 may be determined differently for each electronic device.

For example, the electronic device E1 may be a washing machine. The mobile robot 1 may identify that the washing machine is turned on based on state information transmitted from the washing machine. The mobile robot 1 may move to a location of the washing machine and obtain an image around the washing machine. The mobile robot 1 may identify from the image that a user is operating the washing machine or putting laundry into the washing machine. The mobile robot 1 may determine that the identified user's behavior is associated with the operation of the washing machine. The mobile robot 1 may determine the identified user as a target user to provide event information about a change in operation of the washing machine. Afterwards, while the target user is in a different location, an event in which a washing operation of the washing machine is about to be completed or has been completed may occur.

The mobile robot 1 may move to the target user's location in order to provide the target user with event information about the completion of the washing operation. The mobile robot 1 may move to the target user's location before the washing operation is completed or after the washing operation is completed. In a case where the mobile robot 1 is set to provide a notification regarding the completion of the washing operation, the mobile robot 1 may provide the target user with the event information about the completion of the washing operation through at least one of the display 62 or the speaker 63.

In another example, the electronic device E1 may be a cooking appliance. The mobile robot 1 may identify that the cooking appliance is turned on based on state information transmitted from the cooking appliance. The mobile robot 1 may move to a location of the cooking appliance and obtain an image around the cooking appliance. The mobile robot 1 may identify from the image that a user is operating the cooking appliance or is cooking around the cooking appliance. The mobile robot 1 may determine that the identified user's behavior is associated with the operation of the cooking appliance. The mobile robot 1 may determine the identified user as a target user to provide event information about a change in operation of the cooking appliance. Afterwards, an event in which food being heated by the cooking appliance boils may occur, while the target user is in a different location.

The mobile robot 1 may move to the target user's location in order to provide the target user with the event information about boiling of food. The mobile robot 1 may provide the event information to the target user through at least one of the display 62 or the speaker 63. The mobile robot 1 may receive a heat control command or a cooking end command from the target user, and may transmit the received command to the cooking appliance. For example, the target user may command heat control or stop cooking by voice. The mobile robot 1 may identify the heat control command or the cooking end command for controlling the cooking appliance from the target user's voice input through a microphone. The mobile robot 1 may transmit the heat control command or the cooking end command to the cooking appliance.

Meanwhile, in a situation where the target user may not be found or the event information may not be delivered to the target user, the mobile robot 1 may first stop the operation of the cooking appliance. Then, in a situation where the target user is found or the event information may be delivered to the target user, the mobile robot 1 may provide the event information.

Hereinafter, a method for controlling the mobile robot 1 according to the disclosure is described. Each operation included in the method for controlling the mobile robot may be performed by the controller 200 of the mobile robot 1 including the processor 210.

Figure 7:
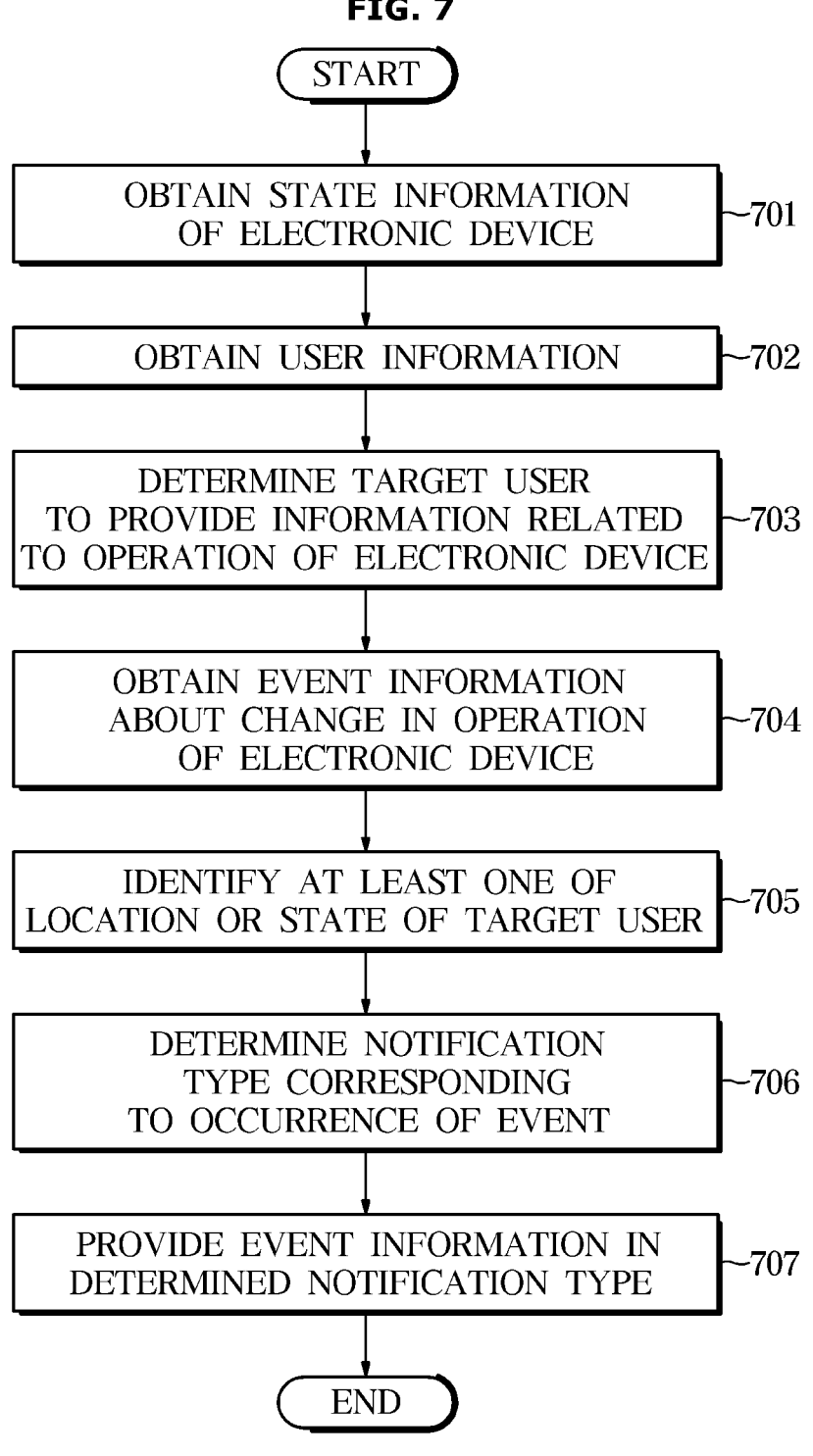
FIG. 7 is a flowchart illustrating a method for controlling a mobile robot according to an embodiment of the disclosure.

FIG. 7 is a flowchart illustrating a method for controlling a mobile robot according to an embodiment of the disclosure.

Referring to FIG. 7, the mobile robot 1 may obtain state information of an electronic device through the communication circuitry 50 in operation 701. The electronic device may refer to the home appliance 10 placed in an indoor space. The state information of the electronic device may include various information, such as an identifier, type, location, whether the electronic device is currently in operation, operation mode, operation time, and whether a failure occurs in the electronic device. The mobile robot 1 may also obtain the state information of the electronic device using the sensor 100. The mobile robot 1 may detect a user and obtain user information using the sensor 100 in operation 702. The sensor 100 may include the camera 110 and the lidar sensor 120 that generate image information, and may include the audio sensor 130 that generates audio information. The controller 200 of the mobile robot 1 may identify the user from at least one of the image information or the audio information, and may obtain the user information.

An order of obtaining the state information of the electronic device and the user information is not limited to the above example, and may vary depending on embodiments. For example, the mobile robot 1 may move to a location of the electronic device in response to receiving the state information indicating an operation of the electronic device, and may control the sensor 100 to search for a user around the electronic device. The mobile robot 1 may determine a person found around the electronic device through the searching, as a user related to the operation of the electronic device.

In another example, the mobile robot 1 may first identify a user and obtain user information while traveling in the indoor space. The mobile robot 1 may obtain state information of an electronic device located around the identified user. The mobile robot 1 may determine that an operation of the electronic device and the user are associated with each other, based on the user information and the state information of the electronic device.

The mobile robot 1 may also determine an owner of the user device 2 as a user associated with the operation of the electronic device, based on the user device 2 being located adjacent to the electronic device.

The mobile robot 1 may determine a target user to provide information related to the operation of the electronic device, based on at least one of the state information of the electronic device or the user information obtained by the sensor 100 in operation 703. Based on a determination that the operation of the electronic device is associated with and the user identified around the electronic device, the mobile robot 1 may determine the user identified around the electronic device, as the target user. The mobile robot 1 may also determine another person designated by a user or a random user searched for in the indoor space, as the target user. Various embodiments of methods for determining a target user are described referring to FIGS. 8 and 9 below.

The mobile robot 1 may obtain event information about a change in operation of the electronic device based on the state information of the electronic device in operation 704. For example, in a case where the electronic device is a washing machine, the mobile robot 1 may detect an event in which a washing operation of the washing machine is completed after the washing operation has started. In a case where the electronic device is a cooking apparatus, the mobile robot 1 may detect an event in which food placed on the cooking apparatus boils after the cooking apparatus has started operation.

The mobile robot 1 may identify at least one of a location or a state of the target user in operation 705. For example, the mobile robot 1 may detect the target user using the sensor 100 and obtain information about the target user while traveling in the indoor space. The mobile robot 1 may identify at least one of the location or the state of the target user based on the information about the target user.

In addition, the mobile robot 1 may identify the location and the state of the target user, based on at least one of image information or audio information that is transmitted from at least one electronic device (e.g., a home cam, an AI speaker, or the like) located around the target user. Furthermore, the mobile robot 1 may monitor a user's behavior to learn a user's behavior pattern, and based on a behavior pattern of a user determined as the target user, may estimate at least one of the location or the state of the target user. In addition, the mobile robot 1 may determine the location of the target user based on a communication signal transmitted from the user device 2 of the target user.

The location of the target user and the state of the target user may be exemplified in various ways. For example, when the target user is lying in a bedroom and the lights are off, the target user may be identified as sleeping. When the target user is in a room or living room and images and sounds are output from a television (TV), the target user may be identified as watching TV. When the target user is located in front of the cooking appliance and the cooking appliance is operating, the target user may be identified as cooking. When the user device 2 of the target user is located outdoors, the target user may be identified as not being indoors.

The mobile robot 1 may determine a notification type corresponding to the event information, based on at least one of the location or the state of the target user in operation 706. The mobile robot 1 may provide the event information in the determined notification type in operation 707. The mobile robot 1 may control the user interface 60 to provide the event information in the determined notification type. The mobile robot 1 may determine the notification type as a visual notification through the display 62 of the user interface 60 or an auditory notification through the speaker 63, based on at least one of the location or the state of the target user. For example, when it is determined that the target user is listening to music in a room, an auditory notification of event information may not be perceived by the target user, and thus the mobile robot 1 may provide the event information as a visual notification. When it is determined that the target user is cooking in a kitchen, a visual notification of event information may not be perceived by the target user, and thus the mobile robot 1 may provide the event information as an auditory notification. In a case where event information is provided as an auditory notification, the mobile robot 1 may adjust a volume of the speaker 63 depending on a situation the target user is in.

In addition, the mobile robot 1 may transmit the event information to at least one other electronic devices (e.g., AI speakers, display devices, or the like) located around the target user, and control the at least one other electronic device to output the event information. For example, the mobile robot 1 may transmit event information about a change in operation of a washing machine to a display device that the target user is viewing. By confirming the event information output through the display device, the target user may ascertain that the change in the operation of the washing machine has occurred. In a case where the target user is cooking, the mobile robot 1 may transmit event information to the cooking appliance to allow the event information about the change in the operation of the washing machine to be output through at least one of a display of the cooking appliance or a speaker of the cooking appliance. In a case where the target user is listening to music using earphones or speakers, the mobile robot 1 may transmit an output signal of the event information to the earphones or speakers. As such, the mobile robot 1 may provide the information related to the operation of electronic device in the notification type suitable for a user's situation, thereby improving user convenience.

Figure 8:
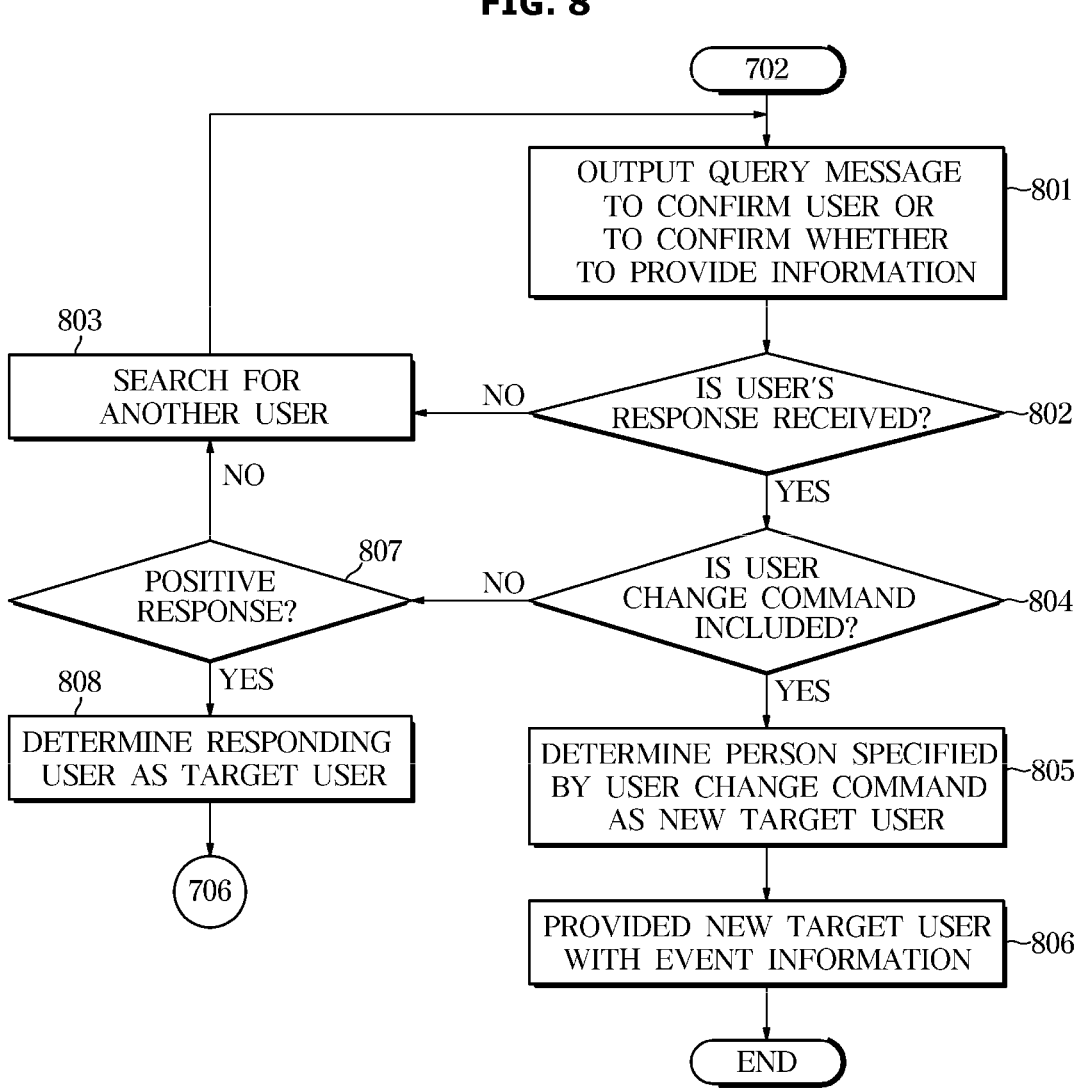
FIG. 8 is a flowchart illustrating a method of determining a target user described in FIG. 7 according to an embodiment of the disclosure.

FIG. 8 is a flowchart illustrating a method of determining a target user described in FIG. 7 according to an embodiment of the disclosure.

Referring to FIG. 8, the mobile robot 1 may obtain at least one of the state information of the electronic device or the user information. Thereafter, the mobile robot 1 may output a query message to confirm a user or to confirm whether to provide information about the operation of the electronic device in operation 801.

The mobile robot 1 may output a first query message through the user interface 60 to confirm whether the identified user is associated with the operation of the electronic device. For example, a first query message, such as 'Mr. X, did you just turn on the cooking appliance?' may be output.

The mobile robot 1 may output a second query message through the user interface 60 to confirm whether to provide information related to the operation of the electronic device. For example, a second query message, such as 'Mr. X, may I provide you with an operation state of washing machine?' may be output. The first query message and the second query message may each be output through at least one of the display 62 or the speaker 63 of the mobile robot 1.

The mobile robot 1 may determine whether the user responds to the first query message or the second query message in operation 802. In a case where a user's response to the first query message or the second query message is not received, the mobile robot 1 may search for another user in operation 803.

Based on receiving the user's response to the query message, the mobile robot 1 may determine whether the user's response includes a user change command in operation 804. The mobile robot 1 may determine whether the user change command is included in the user's response to the first query message or the second query message. For example, the user change command may include a voice command, such as 'Tell my husband.'

In a case where the user's response to the first or second query message includes the user change command, the mobile robot 1 may determine a person specified by the user change command as a new target user in operation 805. The mobile robot 1 may provide event information about a change in operation of the electronic device to the new target user in operation 806. The mobile robot 1 may obtain information about the new target user, and determine a notification type corresponding to a location and a behavior state of the new target user. The mobile robot 1 may provide the event information in the determined notification type.

In addition, the mobile robot 1 may determine whether the received user's response is a positive response or a negative response in operation 807. In a case where a positive response to the first query message or the second query message is received from the user and the user's positive response does not include the user change command, the mobile robot 1 may determine the responding user as the target user in operation 808. Thereafter, in response to an occurrence of an event related to a change in operation of the electronic device, the mobile robot 1 may determine a notification type of event information corresponding to the occurrence of the event, based on the location and behavior state of the target user in operation 706.

However, in a case where the user responds negatively to the first or second query message and the user's negative response does not include the user change command, the mobile robot 1 may search for another user without determining a target user in operations 807, and 803).

Figure 9:
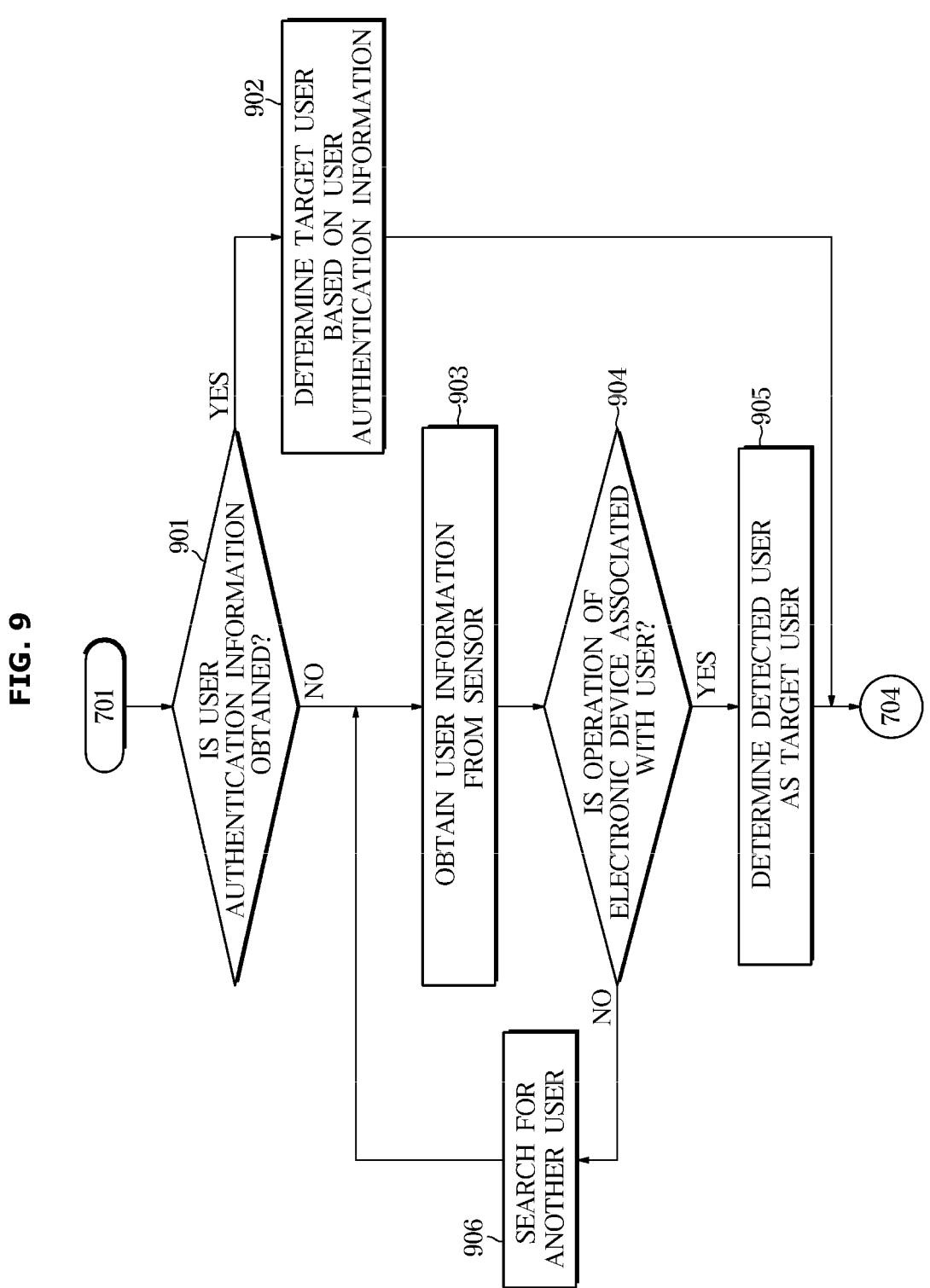
FIG. 9 is a flowchart illustrating a method of determining a target user described in FIG. 7 according to an embodiment of the disclosure.

FIG. 9 is a flowchart illustrating a method of determining a target user described in FIG. 7 according to an embodiment of the disclosure.

Referring to FIG. 9, the mobile robot 1 may obtain user authentication information for operating the electronic device, through the electronic device, the user device 2, the sensor 100, or the user interface 60 in operation 901. For example, the user authentication information may include at least one of biometric information (e.g., fingerprint, iris, face, or the like), account information (e.g., login ID, password, or the like), or tag information of the user device 2. The mobile robot 1 may identify a user associated with the operation of the electronic device based on the input user authentication information. The mobile robot 1 may determine that the user identified through the user authentication information is a target user to provide event information in operation 902. For example, the mobile robot 1 may provide the event information about a change in operation of the electronic device to the user identified through the user authentication information.

In response to a failure to obtain the user authentication information, the mobile robot 1 may obtain user information from the sensor 100 in operation 903. The mobile robot 1 may determine whether the operation of the electronic device and the user are associated with each other, based on the state information of the electronic device (obtained in operation 701) and the user information in operation 904. For example, the mobile robot 1 may detect the electronic device and the user, based on at least one of image information or audio information obtained through the sensor 100. The mobile robot 1 may determine a distance between the electronic device and the user based on at least one of the image information or the audio information. The mobile robot 1 may determine that the operation of the electronic device is associated with the user, based on the user being located within a predetermined distance from the electronic device. In addition, the mobile robot 1 may detect a user's gaze from the image information and determine whether the operation of the electronic device is associated with the user by considering whether the user's gaze is directed to the electronic device.

Based on a determination that the user detected around the electronic device and the operation of the electronic device are associated with each other, the mobile robot 1 may determine the detected user as a target user to provide the event information about a change in the operation of the electronic device in operation 905. In a case where a user is identified around the electronic device, the identified user is likely to have operated the electronic device, and thus the mobile robot 1 may determine that the user identified around the electronic device is associated with the operation of the electronic device.

Based on a determination that the operation of the electronic device is not associated with the detected user, the mobile robot 1 may determine to search for another user in operation 906. For example, in a case where the detected user is outside a predetermined distance from the electronic device, the mobile robot 1 may determine that the detected user is not associated with the operation of the electronic device. Even though the detected user is within the predetermined distance from the electronic device, when it is determined that the detected user is operating another device or the detected user's behavior is irrelevant to the operation of the electronic device, the mobile robot 1 may determine that the detected user is not associated with the operation of the electronic device. In response to another user being detected around the electronic device, the mobile robot 1 may re-determine whether the detected other user is associated with the operation of the electronic device.

Meanwhile, no other user may be detected around the electronic device. In response to no other user being detected around the electronic device, the mobile robot 1 may determine a previously detected user as the target user, or may not determine the target user.

Figure 10:
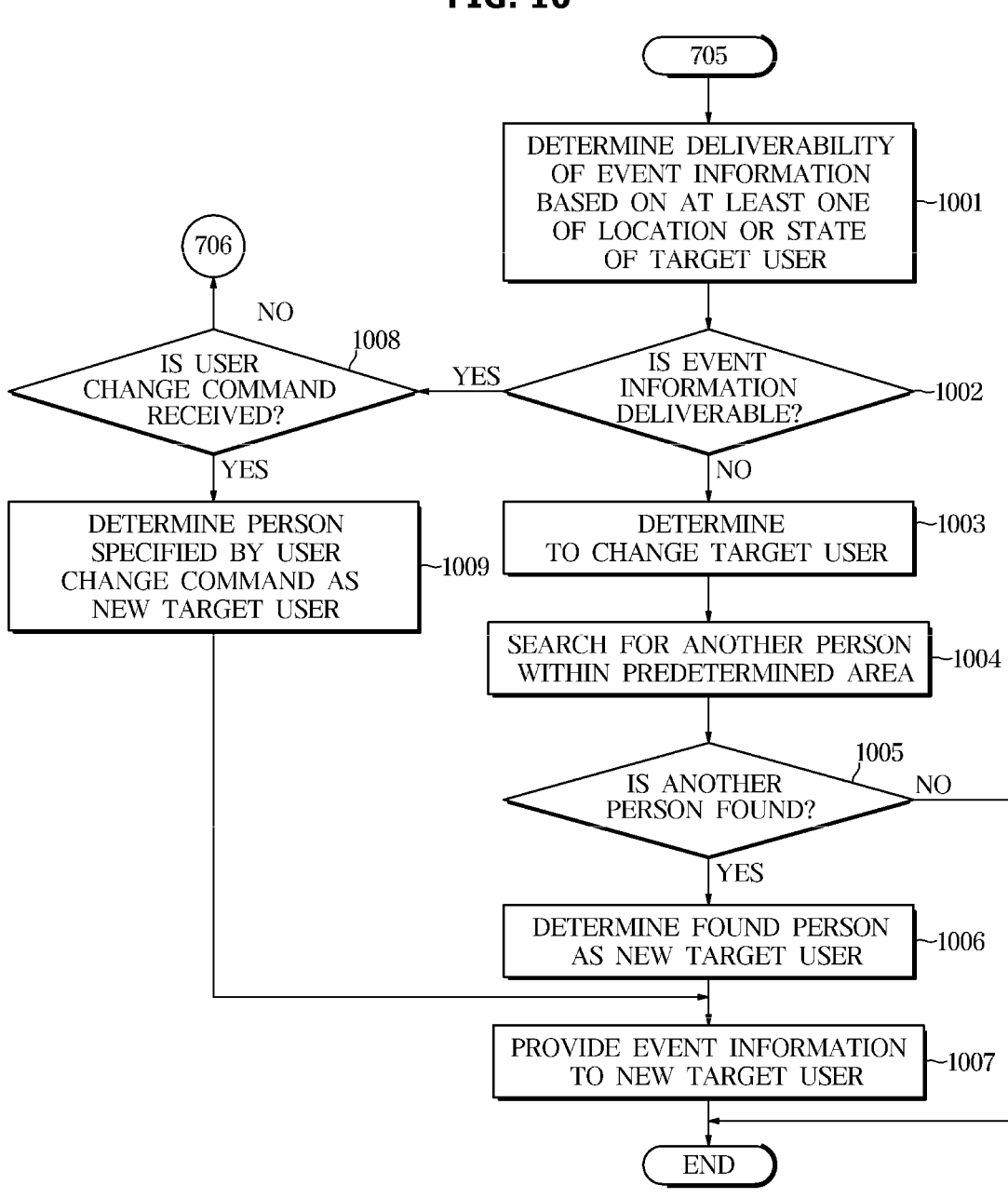
FIG. 10 is a flowchart illustrating a method of changing a target user depending on a location and a behavior state of the target user described in FIG. 7 according to an embodiment of the disclosure.

FIG. 10 is a flowchart illustrating a method of changing a target user depending on a location and a behavior state of the target user described in FIG. 7 according to an embodiment of the disclosure.

Referring to FIG. 10, the mobile robot 1 may determine deliverability of the event information based on at least one of the location or the state of the target user in operation 1001. In other words, the controller 200 may determine whether the target user may receive a notification of the event information. As described above, the mobile robot 1 may identify the location and state of the target user, based on sensing information of the sensor 100 obtained while traveling in the indoor space and information transmitted from at least one electronic device (e.g., a home cam, an AI speaker, or the like) located around the target user. In addition, the mobile robot 1 may monitor a user's behavior to learn a user's behavior pattern, and based on a behavior pattern of a user determined as the target user, may estimate the location and the state of the target user.

In a case where the event information is determined to be deliverable to the target user and no user change command is received in operations 1002, and 1008, the mobile robot 1 may determine a notification type of the event information corresponding to at least one of the location or the state of the target user in operation 706. In a case where the event information is determined to be deliverable to the target user and a user change command is received, the mobile robot 1 may determine a person specified by the user change command as a new target user in operation 1009.

Based on a determination that the event information is not deliverable to the target user, the controller 200 of the mobile robot 1 may determine to change a target user in operations 1002, and 1003. For example, in a case where the target user is not indoors or is sleeping in a bedroom, the mobile robot 1 may determine that the event information is not deliverable to the target user.

The mobile robot 1 may search for a person other than the target user within a predetermined area, based on determining to change the target user in operation 1004. The mobile robot 1 may control the wheel 30 and the sensor 100 to search for another person. In response to the other person being found, the mobile robot 1 may determine the found other person as a new target user in operations 1005, and 1006. The mobile robot 1 may provide the event information to the new target user in operation 1007. In response to no other person being found, the controller 200 may not determine the target user and may not provide a notification of event information.

In a case where a plurality of persons are found as a result of the searching, the mobile robot 1 may determine one of the plurality of persons as the target user based on a predetermined priority. For example, the mobile robot 1 may prioritize a person registered in the user database and determine the person as a target user. The user database may be obtained from the memory 220 or the server 3. In another example, the mobile robot 1 may determine a first found person as the target user. The mobile robot 1 may prioritize an adult among the plurality of persons found and determine the adult as the target user.

FIG. 11 is a flowchart illustrating a method of providing event information described in FIG. 7 according to an embodiment of the disclosure.

Referring to FIG. 11, the mobile robot 1 may provide the target user with the notification of event information about the change in operation of the electronic device two or more times. The mobile robot 1 may control another electronic device to remotely provide a first notification to the target user in operation 1101. The mobile robot 1 may remotely provide the first notification of event information by controlling at least one electronic device (e.g., an AI speaker, a display device, a user device, or the like) located within a predetermined distance from a target user's location.

The first notification of event information may also be provided by the mobile robot 1. For example, the mobile robot 1 may output the first notification of event information by controlling the speaker 63 outside a predetermined distance from the target user's location. In this case, the mobile robot 1 may set a volume of the speaker 63 to the maximum.

Meanwhile, a user's behavior in response to the change in the operation of the electronic device may be required. For example, when a washing operation of a washing machine is completed, a user's behavior to take the laundry out of the washing machine may be required. When food boils in a cooking apparatus, a user's behavior may be required to adjust a heat level of the cooking apparatus or stop the operation of the cooking apparatus.

The mobile robot 1 may determine whether the target user's behavior corresponding to the first notification is detected by monitoring the target user for a predetermined standby time after providing the first notification of event information in operation 1102. For example, the mobile robot 1 may determine whether the target user takes the laundry out in response to the first notification regarding the completion of the washing operation. The mobile robot 1 may determine whether the target user operates the cooking appliance in response to the first notification regarding boiling food.

The mobile robot 1 may determine whether to provide a second notification of event information through the user interface 60 at the target user's location, based on whether the target user's behavior corresponding to the first notification is detected. In response to the target user's behavior not being detected for the predetermined standby time after providing the first notification, the mobile robot 1 may move to the target user's location and provide the second notification through the user interface 60 in operation 1103. In addition, the mobile robot 1 may rotate at the target user's location or rotate around the target user in order to attract the target user's attention.

As described above, by providing the plurality of notifications to the user, information about the operation of the electronic device may be delivered to the user more reliably.

According to an embodiment of the disclosure, the mobile robot may include a communication circuitry configured to communicate with an electronic device, a sensor configured to detect a user, a user interface configured to provide information related to an operation of the electronic device, and a controller configured to be electrically connected to the communication circuitry, the sensor and the user interface. The controller may determine a target user to provide the information related to the operation of the electronic device, based on at least one of state information of the electronic device or user information obtained by the sensor. The controller may obtain event information about a change in the operation of the electronic device. The controller may determine a notification type of the event information, based on at least one of a location of the target user or a state of the target user. The controller may control the user interface to provide the event information in the determined notification type.

The user interface may include a display or a speaker. The controller may determine the notification type as a visual notification through the display or an auditory notification through the speaker, based on at least one of the location of the target user or the state of the target user.

The controller may determine deliverability of the event information, based on at least one of the location of the target user or the state of the target user. The controller may determine to change the target user, based on a determination that the event information is not deliverable to the target user.

The controller may search for a person other than the target user within a predetermined area, based on determining to change the target user, and determine the searched person as a new target user.

The controller may provide a first notification of the event information to the target user, and then determine whether to provide a second notification of the event information at the location of the target user through the user interface based on whether a behavior of the target user corresponding to the first notification is detected.

The controller may provide the second notification through the user interface, based on the behavior of the target user not being detected for a predetermined standby time after providing the first notification.

The controller may output, through the user interface, a first query message for confirming whether the operation of the electronic device is associated with the user or a second query message for confirming whether to provide the information related to the operation of the electronic device. The controller may determine the target user based on a response from the user to the first query message or the second query message.

The controller may obtain a user change command from the target user through the sensor, and determine a person specified by the user change command as a new target user.

The controller may determine whether the operation of the electronic device is associated with the user, based on at least one of image information or audio information obtained through the sensor within a predetermined distance from the electronic device. The controller may determine the user as the target user, or determine to search for another user, based on whether the operation of the electronic device is associated with the user.

The controller may obtain user authentication information that is input to operate the electronic device through the electronic device, the sensor, or the user interface, and determine the target user based on the user authentication information.

The mobile robot may further include a microphone. The controller may identify a control command for controlling the electronic device from a voice of the target user input through the microphone, and transmit the control command to the electronic device through the communication circuitry.

According to an embodiment of the disclosure, the method for controlling a mobile robot may include obtaining state information of an electronic device through a communication circuitry, detecting a user by a sensor to obtain user information, determining a target user to provide information related to an operation of the electronic device, based on at least one of the state information of the electronic device or the user information, obtaining event information about a change in the operation of the electronic device, determining a notification type of the event information, based on at least one of a location of the target user or a state of the target user, and providing the event information in the determined notification type through at least one of a user interface of the mobile robot or another electronic device.

The user interface may include a display or a speaker. The notification type corresponding to the event information may be determined as a visual notification through the display or an auditory notification through the speaker, based on at least one of the location of the target user or the state of the target user.

The determining of the notification type of the event information may further include: determining deliverability of the event information, based on at least one of the location of the target user or the state of the target user, and determining to change the target user, based on a determination that the event information is not deliverable to the target user.

The method for controlling the mobile robot may further include searching for a person other than the target user within a predetermined area, based on determining to change the target user, and determining the searched person as a new target user.

The providing of the event information may include providing a first notification of the event information, and then determining whether to provide a second notification of the event information at the location of the target user through the user interface based on whether a behavior of the target user corresponding to the first notification is detected.

The second notification may be provided through the user interface, based on the behavior of the target user not being detected for a predetermined standby time after providing the first notification.

The method for controlling the mobile robot may further include outputting, through the user interface, a first query message for confirming whether the operation of the electronic device is associated with the user or a second query message for confirming whether to provide the information related to the operation of the electronic device. The target user may be determined based on a response from the user to the first query message or the second query message.

The determining of the target user may further include: obtaining a user change command from the target user through the sensor, and determining a person specified by the user change command as a new target user.

The determining of the target user may include determining whether the operation of the electronic device is associated with the user, based on at least one of image information or audio information obtained through the sensor within a predetermined distance from the electronic device, and determining the user as the target user, or determining to search for another user, based on whether the operation of the electronic device is associated with the user.

The method for controlling the mobile robot may further include obtaining user authentication information that is input to operate the electronic device through the electronic device, the sensor, or the user interface. The target user may be determined based on the user authentication information.

As is apparent from the above, the mobile robot and the method for controlling the mobile robot may track a user and provide information related to an operation of an electronic device other than a user device, even when the user is not in possession of the user device.

The mobile robot and the method for controlling the mobile robot may determine whether a user is in a suitable situation to receive information related to an operation of an electronic device, and provide the information related to the operation of the electronic device in a notification type suitable to the user's situation, thereby improving user convenience.

The disclosed embodiments of the disclosure may be implemented in the form of a recording medium that stores instructions executable by a computer. The instructions may be stored in the form of program codes, and when executed by a processor, the instructions may generate a program module to perform operations of the disclosed embodiments.

The machine-readable recording medium may be provided in the form of a non-transitory storage medium. The term 'non-transitory storage medium' may mean a tangible device without including a signal (e.g., electromagnetic waves) and may not distinguish between storing data in the storage medium semi-permanently and temporarily. For example, the non-transitory storage medium may include a buffer that temporarily stores data.

The method according to the various embodiments of the disclosure may be provided in a computer program product. The computer program product may be a commercial product that may be traded between a seller and a buyer. The computer program product may be distributed in the form of a storage medium (e.g., compact disc read only memory (CD-ROM)), through an application store (e.g., Play Store™) directly between two user devices (e.g., smartphones), or online (e.g., downloaded or uploaded). In the case of online distribution, at least part of the computer program product (e.g., a downloadable app) may be at least temporarily stored or arbitrarily generated in a storage medium that may be readable to a device, such as a server of the manufacturer, a server of the application store, or a relay server.

It will be appreciated that various embodiments of the disclosure according to the claims and description in the specification can be realized in the form of hardware, software or a combination of hardware and software.

Any such software may be stored in the form of volatile or non-volatile storage such as, for example, a storage device like ROM, whether erasable or rewritable or not, or in the form of memory such as, for example, random access memory (RAM), memory chips, device or integrated circuits or on an optically or magnetically readable medium such as, for example, a CD, digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile robot comprising:
a communication circuitry configured to communicate with an electronic device;
a sensor configured to detect a user;
a user interface configured to provide information related to an operation of the electronic device; and
a controller configured to be electrically connected to the communication circuitry, the sensor, and the user interface,
wherein the controller is configured to:
    determine a target user to provide the information related to the operation of the electronic device, based on at least one of state information of the electronic device or user information obtained by the sensor,
    obtain event information about a change in the operation of the electronic device,
    determine a notification type of the event information, based on at least one of a location of the target user or a state of the target user, and
    control the user interface to provide the event information in the determined notification type, and
wherein the controller is further configured to:
    provide a first notification of the event information to the target user, and
    after providing the first notification, determine whether to provide a second notification of the event information at the location of the target user through the user interface based on whether a behavior of the target user corresponding to the first notification is detected.

2. The mobile robot of claim 1, wherein the user interface comprises a display or a speaker, and
the controller is further configured to determine the notification type as a visual notification through the display or an auditory notification through the speaker, based on at least one of the location of the target user or the state of the target user.

3. The mobile robot of claim 1, wherein the controller is further configured to:
determine deliverability of the event information, based on at least one of the location of the target user or the state of the target user, and
determine to change the target user, based on a determination that the event information is not deliverable to the target user.

4. The mobile robot of claim 3, wherein the controller is further configured to:
search for a person other than the target user within a predetermined area, based on determining to change the target user, and
determine the searched person as a new target user.

5. The mobile robot of claim 1, wherein the controller is further configured to:
provide the second notification through the user interface, based on the behavior of the target user not being detected for a predetermined standby time after providing the first notification.

6. The mobile robot of claim 1, wherein the controller is further configured to:
output, through the user interface, a first query message for confirming whether the operation of the electronic device is associated with the user or a second query message for confirming whether to provide the information related to the operation of the electronic device, and
determine the target user based on a response from the user to the first query message or the second query message.

7. The mobile robot of claim 1, wherein the controller is further configured to:
obtain a user change command from the target user through the sensor, and
determine a person specified by the user change command as a new target user.

8. The mobile robot of claim 1, wherein the controller is further configured to:
determine whether the operation of the electronic device is associated with the user, based on at least one of image information or audio information obtained through the sensor within a predetermined distance from the electronic device, and
determine the user as the target user, or determine to search for another user, based on whether the operation of the electronic device is associated with the user.

9. The mobile robot of claim 1, wherein the controller is further configured to:
obtain user authentication information that is input to operate the electronic device through the electronic device, the sensor, or the user interface, and
determine the target user based on the user authentication information.

10. The mobile robot of claim 1, further comprising:
a microphone,
wherein the controller is further configured to:
    identify a control command for controlling the electronic device from a voice of the target user input through the microphone, and
    transmit the control command to the electronic device through the communication circuitry.

11. A method performed by a mobile robot including communication circuitry, a sensor, a user interface, and a controller electrically connected to the communication circuitry, the sensor, and the user interface, the method comprising:
obtaining, by the mobile robot through the communication circuitry, state information of an electronic device;
detecting, by the mobile robot through the sensor, a user to obtain user information;
determining, by the mobile robot, a target user to provide information related to an operation of the electronic device, based on at least one of the state information of the electronic device or the user information;
obtaining, by the mobile robot, event information about a change in the operation of the electronic device;
determining, by the mobile robot, a notification type of the event information, based on at least one of a location of the target user or a state of the target user;
providing, by the mobile robot, the event information in the determined notification type through at least one of the user interface or another electronic device;
providing, by the mobile robot, a first notification of the event information to the target user; and
after providing the first notification, determining, by the mobile robot, whether to provide a second notification of the event information at the location of the target user through the user interface based on whether a behavior of the target user corresponding to the first notification is detected.

12. The method of claim 11, wherein the user interface comprises a display or a speaker, and wherein the notification type corresponding to the event information is determined as a visual notification through the display or an auditory notification through the speaker, based on at least one of the location of the target user or the state of the target user.

13. The method of claim 11, wherein the determining of the notification type of the event information further comprises:

determining deliverability of the event information, based on at least one of the location of the target user or the state of the target user, and determining to change the target user, based on a determination that the event information is not deliverable to the target user.

14. The method of claim 13, further comprising:

searching, by the mobile robot, for a person other than the target user within a predetermined area, based on determining to change the target user; and determining, by the mobile robot, the searched person as a new target user.

15. The method of claim 11, further comprising:

providing, by the mobile robot, the second notification through the user interface, based on the behavior of the target user not being detected for a predetermined standby time after providing the first notification.

16. The method of claim 11, further comprising:

outputting, by the mobile robot through the user interface, a first query message for confirming whether the operation of the electronic device is associated with the user or a second query message for confirming whether to provide the information related to the operation of the electronic device, and determining, by the mobile robot, the target user based on a response from the user to the first query message or the second query message.

17. One or more non-transitory computer-readable storage media storing computer-executable instructions that, when executed by one or more processors of a mobile robot including communication circuitry, a sensor, and a user interface in which the one or more processors is electrically connected to the communication circuitry, the sensor, and the user interface, cause the mobile robot to perform operations, the operations comprising:

obtaining, by the mobile robot through the communication circuitry, state information of an electronic device;

detecting, by the mobile robot through the sensor, a user to obtain user information;

determining, by the mobile robot, a target user to provide information related to an operation of the electronic device, based on at least one of the state information of the electronic device or the user information;

obtaining, by the mobile robot, event information about a change in the operation of the electronic device;

determining, by the mobile robot, a notification type of the event information, based on at least one of a location of the target user or a state of the target user;

providing, by the mobile robot, the event information in the determined notification type through at least one of the user interface or another electronic device;

providing, by the mobile robot, a first notification of the event information to the target user; and after providing the first notification, determining, by the mobile robot, whether to provide a second notification of the event information at the location of the target user through the user interface based on whether a behavior of the target user corresponding to the first notification is detected.

18. The one or more non-transitory computer-readable storage media of claim 17, wherein the user interface comprises a display or a speaker, and wherein the notification type corresponding to the event information is determined as a visual notification through the display or an auditory notification through the speaker, based on at least one of the location of the target user or the state of the target user.

* * * * *